(12) United States Patent
Komori et al.

(10) Patent No.: US 9,174,174 B2
(45) Date of Patent: Nov. 3, 2015

(54) SEPARATION MEMBRANE AND METHOD FOR PRODUCING THE SAME

(75) Inventors: Kenji Komori, Otsu (JP); Toshiyuki Ishizaki, Otsu (JP); Kenta Iwai, Otsu (JP); Xunyao Fu, Otsu (JP); Shinichi Minegishi, Otsu (JP); Nao Minaki, Iyo-gun (JP)

(73) Assignee: Toray Industries, Inc., Tokyo (JP)

( * ) Notice: Subject to any disclaimer, the term of this patent is extended or adjusted under 35 U.S.C. 154(b) by 506 days.

(21) Appl. No.: 13/119,071

(22) PCT Filed: Sep. 18, 2009

(86) PCT No.: PCT/JP2009/066331
§ 371 (c)(1),
(2), (4) Date: May 26, 2011

(87) PCT Pub. No.: WO2010/032808
PCT Pub. Date: Mar. 25, 2010

(65) Prior Publication Data
US 2011/0226689 A1    Sep. 22, 2011

(30) Foreign Application Priority Data

Sep. 19, 2008  (JP) .................. 2008-240733
Mar. 31, 2009  (JP) .................. 2009-085775

(51) Int. Cl.
*B01D 39/00* (2006.01)
*B01D 39/14* (2006.01)
(Continued)

(52) U.S. Cl.
CPC ............ *B01D 71/34* (2013.01); *B01D 67/0009* (2013.01); *B01D 2323/06* (2013.01); *C02F 1/444* (2013.01)

(58) Field of Classification Search
CPC ........ B01D 71/34; B01D 69/12; B01D 71/06; B01D 67/00; B05D 5/00; B29C 47/06
USPC .................. 210/500.35, 500.36, 490, 500.23, 210/500.3, 500.29, 500.42; 254/178 R, 254/171.26, 177.14; 427/244; 264/204
See application file for complete search history.

(56) References Cited

U.S. PATENT DOCUMENTS 4,882,113 A * 11/1989 Tu et al. .................. 264/127
5,066,401 A * 11/1991 Muller et al. ............ 210/500.35
(Continued)

FOREIGN PATENT DOCUMENTS

JP  03228671  10/1991
JP  7265674   10/1995
(Continued)

OTHER PUBLICATIONS

International Search Report dated Dec. 28, 2009, application No. PCT/JP2009/066331.
(Continued)

*Primary Examiner* — Ana Fortuna
(74) *Attorney, Agent, or Firm* — RatnerPrestia

(57) ABSTRACT

A separation membrane including a separation-functional layer is provided, wherein the separation-functional layer contains a polyvinylidene fluoride-type resin having a melt viscosity of 3,300 Pa·s or more, and also the separation-functional layer has a three-dimensional network structure. A separation membrane is provided having high virus removal performance, high pure water permeability, and high physical durability and high chemical strength, which can also be used in the field of water treatment.

14 Claims, 1 Drawing Sheet

(51) Int. Cl.
  *B29C 47/00* (2006.01)
  *B01D 71/34* (2006.01)
  *B01D 67/00* (2006.01)
  *C02F 1/44* (2006.01)

(56) References Cited

U.S. PATENT DOCUMENTS

| | | | | |
|---|---|---|---|---|
| 5,376,273 | A * | 12/1994 | Pacheco et al. | 210/490 |
| 5,472,607 | A * | 12/1995 | Mailvaganam et al. | 210/490 |
| 5,736,051 | A | 4/1998 | Degen | |
| 6,596,167 | B2 * | 7/2003 | Ji et al. | 210/500.42 |
| 7,743,929 | B2 * | 6/2010 | Kools | 210/500.27 |
| 7,842,214 | B2 * | 11/2010 | Romdhane et al. | 264/177.14 |
| 7,861,869 | B2 * | 1/2011 | Beckers et al. | 210/490 |
| 7,867,417 | B2 * | 1/2011 | Mullette | 264/49 |
| 8,739,978 | B2 * | 6/2014 | Yoon et al. | 210/500.36 |
| 2002/0046970 | A1 | 4/2002 | Murase | |
| 2004/0023017 | A1 | 2/2004 | Nagoya | |
| 2004/0092661 | A1 * | 5/2004 | Hedhli et al. | 525/55 |
| 2006/0030685 | A1 * | 2/2006 | Passade Boupat et al. | 526/319 |
| 2006/0178480 | A1 | 8/2006 | Tada | |
| 2006/0180544 | A1 * | 8/2006 | Kools | 210/490 |
| 2007/0084794 | A1 * | 4/2007 | Morikawa et al. | 210/650 |
| 2009/0110900 | A1 | 4/2009 | Yokota | |
| 2009/0178969 | A1 | 7/2009 | Hanakawa et al. | |
| 2010/0000937 | A1 | 1/2010 | Hanakawa et al. | |
| 2011/0017661 | A1 * | 1/2011 | Kosar | 210/500.27 |
| 2011/0226689 | A1 * | 9/2011 | Komori et al. | 210/490 |
| 2013/0040213 | A1 * | 2/2013 | Ito et al. | 429/414 |

FOREIGN PATENT DOCUMENTS

| | | |
|---|---|---|
| JP | 2002166141 | 6/2002 |
| JP | 2006-239680 | 9/2006 |
| JP | 2007-510801 A | 4/2007 |
| JP | 2007-185562 A | 7/2007 |
| JP | 2007289886 | 11/2007 |
| JP | 2008173573 | 7/2008 |
| WO | 03026779 | 4/2003 |
| WO | WO03/106545 A1 | 12/2003 |
| WO | 2004081109 | 9/2004 |
| WO | WO2007/119850 A1 | 10/2007 |
| WO | WO2008/005745 A2 | 1/2008 |
| WO | WO 2008/012872 | 1/2008 |

OTHER PUBLICATIONS

JP Patent Office Examiner; Office Action for Corresponding JP 2009-545418 With English Translation, Issued Sep. 2, 2013.

Gen-Liang Ji, Li-Ping Zhu, Bao-Ku Zhu, Chun-Fang Zhang and You-Yi Xu, "Structure Formation and Characterization of PVDF Hollow Fiber Membrane Prepared Via Tips With Diluent Mixture", Journal of Membrane Science, 319 (2008) pp. 264-270.

Bonyadi, Sina, and Chung, Tai Shung, "Flux Enhancement in Membrane Distillation by Fabrication of Dual Layer Hydrophilic-Hydrophobic Hollow Fiber Membranes"; Journal of Membrane Science, 2007, vol. 306, pp. 134-146.

* cited by examiner

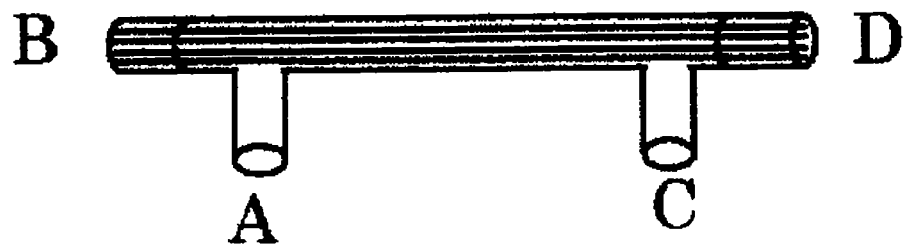

SEPARATION MEMBRANE AND METHOD FOR PRODUCING THE SAME

CROSS-REFERENCE TO RELATED APPLICATIONS

This application is the U.S. National Phase application of PCT International Application No. PCT/JP2009/066331, filed Sep. 18, 2009, and claims priority of Japanese Patent Application Nos. 2008-240733, filed Sep. 19, 2008 and 2009-085775, filed Mar. 31, 2009, the disclosures of such applications being incorporated herein by reference in their entirety for all purposes.

FIELD OF THE INVENTION

The present invention relates to a separation membrane suitable for use in the fields of water treatment, manufacture of pharmaceuticals, food-stuff industry, membrane for blood purification and the like, and a method for producing the same. More particularly, the present invention relates to a separation membrane suitable for the removal of microsubstances such as viruses in a liquid, and a method for producing the same.

BACKGROUND OF THE INVENTION

Recently, separation membranes have been utilized in various fields of water treatment, food-stuff industry and the like. In the filed of water treatment such as manufacture of drinking water, water purifying treatment or waste water treatment, a separation membrane is nowadays employed for removing impurities in water in place of a sand filtration process or a flocculation-sedimentation process in the prior process. For the purpose of preventing bio-fouling of the membrane, a sterilizer such as sodium hypochlorite may be added to the membrane module or the membrane itself is washed with an acid, an alkali, chlorine a surfactant or the like, and thus the separation membrane used in a water purifying treatment is also required to have high chemical strength. Furthermore, the separation membrane is required to have high physical strength so as not to cause fracture during use.

As described above, the separation membrane is required to have, in addition to excellent pure water permeability and separation performance, high chemical strength and high physical strength. For this reason, separation membranes formed from a polyvinylidene fluoride-type resin having both the chemical strength and the physical strength, have recently been used.

Also in the fields of manufacture of drinking water, manufacture of pharmaceuticals and food-stuff industry, when pathogens such as viruses are incorporated into the process, since there is a risk that not only a manufacturing line is contaminated, but also multiple infections of consumers arise, various sterilization technologies are used. The sterilization method includes, for example, a heat treatment and a chemical treatment with chlorine or the like, but exerts a slight effect on viruses having thermoresistance and chemical resistance. Thus, membrane filtration using a separation membrane has become of major interest as a method of physically remove viruses. The membrane filtration has many advantages that enable complete removal of viruses, high separation rate, no need for mixing of impurities and the like.

Examples of the smallest actual virus include parvovirus, poliovirus and the like, each having a diameter of 20 to 30 nm, and examples of the pathogenic virus in water include norovirus having a diameter 25 to 35 nm, adenovirus having a diameter of 70 to 90 nm and the like. Various membranes are disclosed as a separation membrane capable of removing such a virus group.

For example, Patent Document 1 describes a hollow fiber membrane for medical use, made of a polyvinylidene fluoride resin, which exhibits high virus removal performance by controlling a maximum pore diameter determined by a bubble point method within a range from 10 to 100 nm and controlling a thickness of a dense structure layer to 50% or more of the entire membrane thickness. However, since the hollow fiber membrane is formed from one layer having a continuous structure including a coarse structure and also has a small membrane thickness, physical strength per one hollow fiber membrane is low and the hollow fiber membrane cannot be applied for water treatment. Also, since the dense layer is too thick, pure water permeability becomes low regardless of a small membrane thickness.

Patent Document 2 discloses a porous membrane made of a polyvinylidene fluoride-type resin which exhibits a porosity of 55 to 90%, a tensile strength of 5 MPa or more and a fracture elongation of 5% or more by adding a high-molecular weight polyvinylidene fluoride-type resin. However, the same document neither describes nor suggests various parameters and mechanisms for the improvement of a virus removal performance. In the case of using the porous membrane made of a polyvinylidene fluoride-type resin having the molecular weight recited in Examples of the same document, sufficient virus removal performance could not be obtained.

Patent Document 3 describes a porous membrane made of polyvinylidene fluoride-type resin, including reinforcing fibers, and a support layer and a dense layer which exhibits a separation characteristic to the support layer. However, the same document also neither describes nor suggests various parameters and mechanisms for the improvement of a virus removal performance. In the case of using the porous membrane made of a polyvinylidene fluoride-type resin recited in Examples of the same document, sufficient virus removal performance could not be obtained.

Patent Document 4 describes a polymeric porous hollow fiber membrane having a characteristic structure, which contains a hydrophobic polymer and a hydrophilic polymer and includes a dense layer on an inner surface and an outer surface, in which a porosity increases toward the outer surface from the inner surface at first and, after passing at least one maximum portion, the porosity decreased at the outer surface side and a pore diameter of the inner surface has a specific relationship with an exclusion limit particle diameter. However, the same document also neither describes nor suggests various parameters and mechanisms for the improvement of a virus removal performance. Also, in Example, there was no description that a polyvinylidene fluoride-type resin was specifically used.

Patent Document 1: Pamphlet of International Publication WO 03/26779
Patent Document 2: Pamphlet of International Publication WO 04/81109
Patent Document 3: JP-A-2002-166141
Patent Document 4: JP-A-2007-289886

SUMMARY OF THE INVENTION

Conventionally, a separation membrane to remove contaminants containing viruses can satisfy high removal performance and high physical durability. However, it was very difficult to also satisfy high permeability. The reason is as follows. First, in order to obtain high removal performance, it is necessary to form a membrane having a dense structure from a high-concentration resin stock solution. Although physical strength is improved by using the high-concentration resin stock solution, a void ratio inside the membrane becomes lower and thus permeability decreases. In order to increase the permeability, it becomes necessary to decrease the thickness of the membrane, resulting in a decrease in a physical strength. When the separation membrane has a low physical strength, pores are deformed in case a pressure is applied to the separation membrane by an operation such as filtration or washing. When a pore diameter is enlarged by the deformation of pores, trace components such as viruses in contaminants are leaked. In contrast, when the pore diameter is reduced, the permeability decreases. Also, abrasion and damage of the surface are caused by suspended solids in a solution to be separated and thus contaminants such as viruses are leaked. Furthermore, when the thickness of the film is decreased, the membrane may not sometimes exhibit a virus removal performance as the original purpose. In the case of using for a water treatment, since particularly large external force is applied to the separation membrane, it is indispensable to increase a physical strength for the purpose of particularly removing trace components such as viruses.

In light of the problems described above, it is beneficial to provide a separation membrane having high virus removal performance, high pure water permeability, high physical strength and high chemical strength, which can be used in a water treatment.

The present inventors have intensively studied about these problems and succeeded in obtaining a separation-functional layer, which is excellent in a chemical and physical strength as compared with the prior art, and also exhibits high virus removal performance even in the case of forming into a thin membrane, by forming a three-dimensional network structure using a high concentration of a polyvinylidene fluoride-type resin having a melt viscosity of 3,300 Pa·s or more which has never been used in the prior art. Furthermore, the present inventors has succeeded in developing a separation membrane, which is excellent in a chemical and physical strength, and also reconcile high pure water permeability and high virus removal performance, by employing a multi-layered structure of a separation-functional layer which reconciles a permeability and a virus removal performance in a high level, and a support layer which bears high physical strength.

That is, the present invention provides a separation membrane including a separation-functional layer, wherein the separation-functional layer contains a polyvinylidene fluoride-type resin having a melt viscosity of 3,300 Pa·s or more, and also the separation-functional layer has a three-dimensional network structure.

Also, the present invention includes a method for producing a separation membrane, which includes coating a polymer solution containing a polyvinylidene fluoride-type resin on at least one surface of a support and then immersing the coated polyvinylidene fluoride-type resin in a solidifying liquid thereby solidifying the polymer solution to form a separation-functional membrane having a three-dimensional network structure, thus producing a separation membrane having a multi-layered structure in which a separation-functional layer and a support layer are laminated to each other, wherein the polymer solution contains 5% by weight or more and 30% by weight or less of a polyvinylidene fluoride-type resin having a melt viscosity 3,300 Pa·s or more.

Also, the present invention includes a method for producing a separation membrane, which includes simultaneously ejecting a polymer solution forming a separation-functional layer, a polymer solution forming a support layer and a hollow portion-forming solution through an outer tube, an intermediate tube and an inner tube, respectively, using a triple co-extrusion head, and then solidifying the ejected polymer solutions in a solidifying bath to produce a hollow fiber membrane in which the separation-functional layer is disposed at an outer layer and the support layer is disposed at an inner layer.

According to embodiments of the present invention, there is provided a separation membrane made of a polyvinylidene fluoride-type resin, which is excellent in a chemical and physical strength, and also reconciles high pure water permeability and high virus removal performance, and a method for producing the same.

BRIEF DESCRIPTION OF THE DRAWINGS

FIG. 1 is a schematic configuration diagram of an evaluation module of the degree of increase in filtration resistance used in Examples.

DETAILED DESCRIPTION OF THE INVENTION

Specific embodiments of the present invention will be described below.

The separation membrane according to one embodiment of the present invention is a separation membrane including a separation-functional layer, wherein the separation-functional layer contains a polyvinylidene fluoride-type resin having a melt viscosity of 3,300 Pa·s or more, and also the separation-functional layer has a three-dimensional network structure.

The polyvinylidene fluoride-type resin means a resin containing a vinylidene fluoride homopolymer and/or a vinylidene fluoride copolymer, and may also contain plural vinylidene fluoride-type resins. The vinylidene fluoride copolymer is a copolymer containing a monomer unit of vinylidene fluoride, and typically a copolymer of a vinylidene fluoride monomer and a fluorinated-type monomer other than the vinylidene fluoride monomer. Examples of such a copolymer include a copolymer of one or more kinds selected from vinyl fluoride, ethylene tetrafluoride, propylene pentafluoride and polychlorotrifluoroethylene, and vinylidene fluoride. Also, a monomer other than the fluorinated-type monomer, for example, a monomer such as ethylene may be copolymerized. It is preferred to use a resin made of a vinylidene fluoride homopolymer, among these resins, from the viewpoint of high chemical strength and physical strength.

It is necessary that the polyvinylidene fluoride-type resin has a melt viscosity of 3,300 Pa·s or more. The polyvinylidene fluoride-type resin having high melt viscosity is excellent in a chemical and physical strength as compared with the resin having a low melt viscosity, but had problems such as poor moldability and control of a structure with difficulty. Furthermore, even in the case of using the polyvinylidene fluoride-type resin having a low melt viscosity, it has a sufficient strength as compared with other resins which can be used in the separation membrane, and thus the polyvinylidene fluoride-type resin having high melt viscosity was not employed as a separation membrane material. It is considered that, by using a polyvinylidene fluoride-type resin having a melt viscosity of 3,300 Pa·s or more, not only the physical strength of the resulting separation-functional layer is improved, but also a dense network structure capable of exhibiting virus removal performance is formed and also the generation of macrovoids capable of lowering separation characteristics can be suppressed. Since the polyvinylidene fluoride-type resin used in embodiments of the present invention is an ultra-high molecular weight type resin, the weight average molecular weight exceeds the limit of analysis by usual chromatography and therefore cannot be directly calculated. However, it is possible to roughly estimate approximate weight average molecular weight from the above melt viscosity or the viscosity of the solution developed in a specific solvent. In the case of a vinylidene fluoride homopolymer, the weight average molecular weight corresponding to a melt viscosity of 3,300 Pa·s is about 800,000. Examples of the vinylidene fluoride homopolymer having a melt viscosity of 3,300 Pa·s or more include Kynar® HSV900 manufactured by Arkema Inc. (emulsion polymerization product). Herein, the melt viscosity of the polyvinylidene fluoride-type resin can be measured under the conditions of a shear rate 100 seconds$^{-1}$ in ASTM D3835/230° C.

In order to controls the melt viscosity of the polyvinylidene fluoride-type resin to 3,300 Pa·s or more, methods of increasing the molecular weight by increasing the polymerization degree of the polyvinylidene fluoride-type resin or introducing a side chain is preferred from the viewpoint of simplicity. Among these methods, the method of increasing the molecular weight by increasing the polymerization degree is more preferred from the viewpoint of high chemical and physical strength. Also, two or more kinds of polyvinylidene fluoride-type resins each having a different melt viscosity may be mixed thereby controlling the melt viscosity of the mixture to 3,300 Pa·s or more.

The melt viscosity of the polyvinylidene fluoride-type resin is preferably 3,800 Pa·s or more, and more preferably 4,400 Pa·s or more. The weight average molecular weight corresponding to a melt viscosity of 3,800 Pa·s is bout 880,000, and the weight average molecular weight corresponding to a melt viscosity of 4,400 Pa·s is about 1,000,000. Herein, there is no particular limitation on the upper limit of the melt viscosity of the polyvinylidene fluoride-type resin. However, when the melt viscosity exceeds 7,000 Pa·s or the weight average molecular weight exceeds 1,600,000, water permeability of the separation membrane may decreases, and therefore it is not preferred.

Also, by adding the polyvinylidene fluoride-type resin to a separation-functional layer thereby further allowing a hydrophilic polymer to be contained, pure water permeability and stain resistance of the separation membrane are improved, and therefore it is more preferred. Herein, the hydrophilic polymer refers to a polymer having high affinity with water and refers to a polymer which is dissolved in water, or has a small contact angle to water as compared with the polyvinylidene fluoride-type resin. Preferred examples of the hydrophilic polymer include polyvinylpyrrolidone, polyethylene glycol, polyvinyl alcohol, acrylic resin such as polyacrylic acid or polymethyl methacrylate, cellulose ester-type resin, polyacrylonitrile, polysulfone and the like. It is also possible to use, as the hydrophilic polymer, a hydrophilized polyolefinic resin obtained by copolymerizing an olefinic monomer such as ethylene, propylene or vinylidene fluoride with a hydrophilic group. It is particularly preferred to contain at least one kind selected from a polyvinylpyrrolidone resin, an acrylic resin and a cellulose ester-type resin from the viewpoint of an improvement in stain resistance.

The polyvinylpyrrolidone resin means a vinylpyrrolidone homopolymer and/or a copolymer of vinylpyrrolidone and the other polymerizable vinyl monomer. There is no particular limitation on the molecular weight of the polyvinylpyrrolidone resin. However, from the viewpoint of water permeability, separability, moldability and the like of the membrane, the weight average molecular weight is preferably 10,000 or more and 5,000,000 or less. When the weight average molecular weight is less than 10,000, the polyvinylpyrrolidone resin is likely to flow out of the membrane as pore forming agent in the membrane-forming stage, and thus fouling resistance of the membrane deteriorates. In contrast, when the weight average molecular weight is more than 5,000,000, and thus the viscosity of the polymer solution is too high, moldability decreases and drawbacks are likely to arise.

It is known that the polyvinylpyrrolidone resin is inferior in compatibility with the polyvinylidene fluoride-type resin, and thus the polyvinylpyrrolidone resin may be eluted out of the membrane during use of the produced membrane in water and it may be impossible to maintain low fouling property. However, by using a high-molecular weight polyvinylidene fluoride-type resin having a melt viscosity of 3,300 Pa·s or more as the material of a separation-functional membrane, elution of the polyvinylpyrrolidone resin can be suppressed.

The acrylic resin is not particularly limited as long as it is synthesized from a monomer such as an unsaturated carboxylic acid, and an ester or an amide thereof, and a polymer of an acrylic ester, a polymer of a methacrylic ester, and a copolymer thereof are used particularly preferably.

Examples of the polymer of the acrylic ester include a homopolymer of an acrylic ester monomer such as methyl acrylate, ethyl acrylate, n-butyl acrylate, iso-butyl acrylate, tert-butyl acrylate, 2-ethylhexyl acrylate, glycidyl acrylate, hydroxyethyl acrylate or hydroxypropyl acrylate, a copolymer of these monomers, and a copolymer of these monomers and other copolymerizable vinyl monomers.

Examples of the polymer of the methacrylic ester include homopolymer of a methacrylic ester monomer such as methyl methacrylate, ethyl methacrylate, n-butyl methacrylate, iso-butyl methacrylate, tert-butyl methacrylate, 2-ethylhexyl methacrylate, glycidyl methacrylate, hydroxyethyl methacrylate or hydroxypropyl methacrylate, a copolymer of these monomers, and a copolymer of these monomers and other copolymerizable vinyl monomers.

Also, the molecular weight of the acrylic resin used in the present invention is preferably 100,000 or more and 5,000,000 or less, and more preferably 300,000 or more and 4,000,000 or less, in terms of a weight average molecular weight from the viewpoint of the mechanical and chemical strength. In case the weight average molecular weight is less than 100,000, the mechanical strength is low. In contrast, in case the weight average molecular weight exceeds 5,000,000, moldability deteriorates and thus drawbacks are likely to arise.

It is also preferred to use a polyvinylpyrrolidone resin and an acrylic resin in combination. For example, it is known that the acrylic resin such as a polymethacrylic ester or a polyacrylic ester is hydrophilic and is compatible with the polyvinylidene fluoride-type resin in a molecular level. Also, it is known that acrylic resin also has affinity to a polyvinylpyrrolidone resin. Therefore, it is considered that the acrylic resin functions as a compatibilizing agent and enables the polyvinylpyrrolidone resin to easily compatible in the membrane made of a polyvinylidene fluoride-type resin, and the polyvinylpyrrolidone resin is not easily eluted out of the membrane when the membrane is used in water, thus making it possible to maintain stain resistance.

The cellulose ester-type resin is not particularly limited as long as it contains a cellulose ester, as a molecular unit, in a main chain and/or a side chain, and the molecular unit other than the cellulose ester may exist. Examples of the molecular unit other than the cellulose ester include alkene such as ethylene or propylene; alkyne such as acetylene; vinyl halide, vinylidene halide, methyl methacrylate, methyl acrylate and the like. Ethylene, methyl methacrylate, methyl acrylate are used particularly preferably since they are commercially available at low cost and are easily introduced in a main chain and/or a side chain. It is possible to use, as the introduction method, known polymerization technologies such as radical polymerization, anionic polymerization and cationic polymerization. A homopolymer containing substantially only a cellulose ester as a molecular unit is preferably used since it is commercially available at low cost and is easily handled. Examples of such a homopolymer include cellulose acetate, cellulose acetate propionate, cellulose acetate butyrate and the like.

The cellulose ester-type resin is used to form a separation-functional layer, together with the polyvinylidene fluoride-type resin, and therefore it is preferred to mix with the polyvinylidene fluoride-type resin under an appropriate condition. Furthermore, the case where the cellulose ester-type resin and the polyvinylidene fluoride-type resin are mixed and dissolved in a good solvent of the polyvinylidene fluoride-type resin is particularly preferred since it becomes easily to handle.

When a portion of the ester of the cellulose ester-type resin is hydrolyzed, a hydroxyl group having higher hydrophilicity than that of the ester is formed. When the proportion of the hydroxyl group increases, miscibility with a hydrophobic polyvinylidene fluoride-type resin decreases. However, hydrophilicity of the obtained separation membrane increases, and water permeability and stain resistance are improved. Therefore, a technique of hydrolyzing an ester within a range of being mixed with the polyvinylidene fluoride-type resin can be preferably employed from the viewpoint of improving membrane performance In the case of enabling the separation-functional layer to contain a hydrophilic polymer, a weight ratio of the polyvinylidene fluoride-type resin to the hydrophilic polymer is preferably from 60/40 to 99/1, more preferably from 70/30 to 95/5, and still more preferably from 80/20 to 90/10. In case weight ratio of the polyvinylidene fluoride-type resin is less than 60% by weight, it is impossible to exhibit high virus removal performance and high physical durability. In case the weight ratio of the hydrophilic polymer is less than 1% by weight, stain resistance is slightly improved.

The three-dimensional network structure of the separation-functional layer refers to a structure in which solid part are three-dimensionally spread in the form of a network structure.

In case the separation-functional layer is divided into thin layers each having a thickness of 0.2 μm along a thickness direction, the number of thin layers having a maximum pore diameter of 0.03 μm or more and 0.6 μm or less is 50 or more and 400 or less, and also the number of thin layers having a maximum pore diameter of less than 0.03 μm is preferably 2 or less. When the number of thin layers having a maximum pore diameter of 0.03 μm or more and 0.6 μm or less is less than 50, virus removal performance deteriorates. When the number of thin layers having a maximum pore diameter of 0.03 μm or more and 0.6 μm or less exceeds 400, pure water permeability deteriorates. Also, in case three or more thin layers having a maximum pore diameter of less than 0.03 μm exist, pure water permeability deteriorates. Also even in case about 400 thin layers having a maximum pore diameter of more than 0.6 μm exist, it becomes difficult to obtain sufficient virus removal performance.

Herein, the maximum pore diameter of the thin layer having a thickness of 0.2 μm can be measured as follows. Using a scanning electron microscope or the like, a cross section of a separation-functional layer is photographed continuously from an outer surface to an inner surface at a magnification which enables clear confirmation of a structure, preferably a magnification of 60,000 times or more. The distance from the outer surface as a starting point of the separation-functional layer to the inner surface was divided into thin layers each having a thickness of 0.2 μm along a thickness direction of the separation-functional layer and a maximum pore diameter of pores existing in each thin layer is measured. The pore refer to the region surrounded by a solid portion and a maximum pore diameter means a minor axis of a pore having a maximum minor axis among pores existing in the layer. The major axis of the pore is a distance between two points, which are most far apart from each other, on a boundary line between the pore and the solid part. The minor axis of the pore is a distance between two points in which a perpendicular bisector of a line segment of the major axis of the pore intersects with the pore. Also, in case the pore exists across plural layers, it is defined that all layers contain the pore.

The separation-functional layer has high removal performance against the smallest virus. The smallest virus has a size of about 0.02 μm and, when the separation-functional layer has 50 or more and 400 or less of thin layers each having a thickness 0.2 μm and having a maximum pore diameter of 0.03 μm or more and 0.6 μm or less, the layer including pores each having a pore diameter, which is slightly larger than the size of the smallest virus, exists with a certain thickness or more.

Each thin layer having a thickness 0.2 μm and having a maximum pore diameter of 0.03 μm or more and 0.6 μm or less has not high virus removal performance. However, the separation-functional layer utilizes so-called depth filtration in which the existence of some thin layers described above enhances removal performance by a multistage filtration mechanism. As compared with so-called surface filtration in which viruses are removed by a dense layer which has a thickness of about 0.6μ and does not include pores having a pore diameter larger than the size of viruses, and also has a small membrane thickness (most of them exist on the membrane surface), depth filtration can maintain virus removal performance even when defects such as pinholes and cracking arise since the entire separation-functional layer exhibits virus removal performance. Furthermore, since the dense layer does not exist, high pure water permeability can be exhibited. The reason is that pure water permeability is proportional to the fourth power of the pore diameter (Poiseuille's law) and is inversely proportional to the first power of the thickness of the layer. Namely, a decrease in water permeability is suppressed by increasing the thickness of the layer as compared with the case of decreasing the pore diameter of the pore.

Thereby, as a membrane form having higher effect taking virus removal performance and pure water permeability into consideration, in case the separation-functional layer is divided into thin layers each having a thickness of 0.2 μm along the thickness direction, the number of thin layers having a maximum pore diameter 0.2 μm or more and 0.6 μm or less is 50 or more and 400 or less, and the number of thin layer having a maximum pore diameter 0.1 μm or more and less than 0.2 μm is 100 or less, and the number of thin layer having a maximum pore diameter of 0.03 μm or more and less than 0.1 μm is 30 or less, and the number of thin layer having a maximum pore diameter of less than 0.03 μm is 2 or less. In order to prevent deterioration of pure water permeability, the number of thin layer having a maximum pore diameter of less than 0.03 μm is more preferably 1 or less, and most preferably 0 or less. As described above, in order to enhance removal performance and pure water permeability to the maximum extent possible, it is effective to have a depth filtration structure in which a relationship between the maximum pore diameter and the thickness is appropriately controlled.

The three-dimensional network structure of the separation-functional layer is preferably a three-dimensional network structure having an average pore diameter of 0.01 μm or more and 1 μm or less. In this case, viruses can be more preferably removed. Therefore, in the separation-functional layer, it is considered that so-called depth filtration in which small particles and viruses are captured in fine pores predominantly arises as compared with sieving filtration in which filtration is conducted using a pore diameter smaller than the size of viruses. The average pore diameter of the three-dimensional network structure of the separation-functional layer is more preferably 0.03 μm or more and 0.5 μm or less, and still more preferably 0.05 μm or more and 0.2 μm or less. When the average pore diameter is less than 0.01 μm, membrane permeability tends to deteriorate. In contrast, when the average pore diameter exceeds 1 μm, a rejection rate of viruses decreases. Herein, the average pore diameter of the three-dimensional network structure in the separation-functional layer can be determined by photographing a cross section on 20 points of a separation membrane was photographed at a magnification of 6,000 times or 10,000 times using a scanning electron microscope, measuring a major axis and a minor axis of pores on 20 points selected arbitrarily in a depth of 2 μm from an outer surface layer of each photograph, and then arithmetically averaging all measured values.

Also, the average pore diameter of the outermost surface of the separation-functional layer according to the present invention is preferably 1 μm or less, more preferably 0.1 μm or less, and still more preferably 0.01 μm or less. When the average pore diameter of the outermost surface exceeds 1 μm, fouling components in water enter into fine pores of the membrane and thus membrane fouling is likely to arise. Herein, the average pore diameter of the outermost surface of the separation-functional layer can be determined by photographing a cross section on 20 points of a composite membrane was photographed at a magnification of 30,000 times or 60,000 time using a scanning electron microscope, measuring a major axis and a minor axis of pores on 20 points selected arbitrarily of each micrograph, and then arithmetically averaging all measured values.

The three-dimensional network structure of the separation-functional layer of the present invention may be obtained by a so-called non-solvent induced phase separation method in which a solution of a polyvinylidene fluoride-type resin and a good solvent is solidified in a non-solvent bath. In general, since the polyvinylidene fluoride-type resin has strong flocculation properties, only a structure including macrovoids can be obtained. Herein, the macrovoid refers to the pore including voids having the size, which is several tens times larger than that of conventional pores, of the three-dimensional network structure. Since the macrovoid scarcely exhibits resistance to a filtration fluid, an improvement in pure water permeability can be expected. However, the macrovoid has no separation function since it is the void, and causes strike-through of viruses due to drawbacks, pinholes and the like. Specifically, the macrovoid is a generic term of the void which exists in the membrane of the separation-functional layer and has a size of 5 μm or more, usually from 5 to 200 μm, and also has a spherical, spindle or cylindrical shape.

Taking physical strength of the separation-functional layer and reliability of the removal of viruses into consideration, it is preferred that macrovoids having substantially a size of 5 μm or more are not formed. Macrovoids having substantially a size of 5 μm or more are pores whose major axis becomes 5 μm or more in case a cross section of the separation-functional layer is photographed at a magnification of 3,000 times using a scanning electron microscope. In case it is difficult to judge the major axis, the major axis can be determined by the method in which a circle (equivalent circle) having the same area as that of the pore is determined and the diameter of the equivalent circle is taken as the major axis of the pore, using an image processing system or the like. The absence of macrovoids having substantially a size of 5 μm or more is confirmed by the following procedure. That is, cross-sectional photographs on at least different 30 points were observed and, in case any macrovoid having substantially a size of 5 μm or more could not be confirmed, it is defined that macrovoids having substantially a size of 5 μm or more are absent. Also, the separation-functional layer may include macrovoids having a size of less than 5 μm. However, from the viewpoint of virus removal performance, a lesser number of macrovoids provides the better results, and no macrovoid provides best results.

In order to suppress the formation of macrovoids, it is required to suppress the flocculation of a polyvinylidene fluoride-type resin, which has hitherto been studied. For example, there is a method in which a good solvent of a polyvinylidene fluoride-type resin is added in a solidifying bath thereby decreasing the concentration of a non-solvent in the solidifying bath so as to decrease a penetration rate of the non-solvent. This method is employed particularly preferably in the present invention since it is easy to control the concentration and also a thick dense layer is not formed on the separation-functional layer.

In the non-solvent induced phase separation method, penetration of the non-solvent into a polymer solution causes not only a change in the composition of the polymer solution with a lapse of time, but also a rapid change, resulting in difficulty of tracking. Analysis of a mechanism of phase separation is the focus of scientific interest still now. Particularly, in case other components are added in addition to three components of a resin, a good solvent and a non-solvent, it is said to be almost impossible to perform statistical analysis. Furthermore, in non-solvent induced phase separation, a lot of factors such as the temperature and viscosity of a polymer solution, and the composition, temperature and solidification time of a solidifying bath exert an influence, in addition to the composition, a contribution ratio of a factor exerting an influence on phase separation varies depending on the composition of the polymer solution. The present inventors have studied about various factors whether or not they exert an influence on the formation of macrovoids, and found that a viscosity of a polymer solution exerts a large influence on the formation of macrovoids in phase separation of a polyvinylidene fluoride-type polymer solution. Namely, when the viscosity of the polyvinylidene fluoride-type resin solution is increased, macrovoids tend to disappear. It is difficult to clarify details of this phenomenon. However, it is considered that an increase in the viscosity of the polymer solution leads to a decrease in a penetration rate of a non-solvent and a decrease in a flocculation rate of a resin, resulting in phase separation in an ultramicro portion.

A solution viscosity at 50° C. of a polyvinylidene fluoride-type resin solution to form a three-dimensional network structure which exhibits such virus removal performance and enables suppression of the formation of macrovoids is preferably 1 Pa·s or more and 100 Pa·s or less. Herein, the melt viscosity at 50° C. can be measured by a viscometer such as B type viscometer. When the solution viscosity is less than 1 Pa·s, the effects of a decrease in a penetration rate of a non-solvent and a decrease in a flocculation rate become insufficient and thus macrovoids are formed. In contrast, when the solution viscosity exceeds 100 Pa·s, a homogeneous solution cannot be obtained and defects may arise in the three-dimensional network structure.

A polyvinylidene fluoride-type resin solution having such a solution viscosity is preferably prepared so that the concentration of a polyvinylidene fluoride-type resin having a melt viscosity of 3,300 Pa·s or more falls within a range of 5% by weight or more and 30% by weight or less, and preferably 8% by weight or more and 25% by weight or less. In order to exhibit high-level virus removal performance, it is preferred to adjust so that the concentration of the polyvinylidene fluoride-type resin having a melt viscosity of 3,300 Pa·s or more in the polymer solution falls within a range of 9% by weight or more. In case the polymer solution contains a resin other than the polyvinylidene fluoride-type resin having a melt viscosity of 3,300 Pa·s or more, the sum of the concentrations of the resins is preferably within the above range.

The good solvent used in a polyvinylidene fluoride-type resin solution which forms a separation-functional layer is not particularly limited as long as it dissolves the polyvinylidene fluoride-type resin which constitutes the separation-functional layer and, if necessary, resins other than the polyvinylidene fluoride-type resin and also can form a three-dimensional network structure by a non-solvent organic phase separation method, and preferred examples thereof include solvents such as N,N-dimethylformamide, N,N-dimethylacetamide, N-methyl-2-pyrrolidone, dimethyl sulfoxide, methyl ethyl ketone, acetone, tetrahydrofuran, tetramethylurea, trimethyl phosphate; and a mixed solvent thereof. Among these solvents, dimethyl sulfoxide is preferably used since a polyvinylidene fluoride-type resin solution having high viscosity is easily obtained.

Examples of the non-solvent which exhibits non-solvent induced phase separation include water; aliphatic hydrocarbons, aromatic hydrocarbons, aliphatic polyhydric alcohols, aromatic polyhydric alcohols and chlorinated hydrocarbons, such as hexane, pentane, benzene, toluene, methanol, ethanol, carbon tetrachloride, o-dichlorobenzene, trichloroethylene, ethylene glycol, diethylene glycol, triethylene glycol, propylene glycol, butylene glycol, pentanediol, hexanediol and low-molecular weight polyethylene glycol; and a mixed solvent thereof. For the purpose of decreasing a rate of non-solvent induced phase separation, a good solvent is preferably added to the non-solvent in the proportion within a range from 5 to 90% by weight, more preferably from 10 to 80% by weight, and still more preferably from 20 to 70% by weight.

The separation membrane of the present invention may be a single-layered membrane composed of a separation-functional layer alone, and preferably has a multi-layered structure in which a separation-functional layer and a support layer are laminated to each other so as to increase the physical strength while maintaining permeability of the entire separation membrane. The material of the support layer is not particularly limited and, for example, polyolefinic resins such as a polyvinylidene fluoride-type resin, a polysulfone-type resin, a polyacrylonitrile-type resin and polypropylene; hydrophilized polyolefinic resins such as hydrophilized polyethylene; a cellulose ester-type resin, a polyester-type resin, a polyamide-type resin, a polyethersulfone-type resin and the like are preferably used. A copolymer of these resins and those obtained by introducing a substituent into a portion thereof may also be used. Also, these resins may contain a fibrous substance or the like as a reinforcing agent. Since the material of the support layer requires physical strength and high chemical durability, a polyvinylidene fluoride-type resin is more preferably used.

From the viewpoint of physical strength and water permeability, the structure of the support layer is more preferably composed of a spherical structure. The spherical structure refers to a structure in which a lot of spherical (including generally spherical) solid parts are connected to each other by sharing a portion thereof. Herein, the spherical solid part is a solid part having roundness (major axis/minor axis) of 2 or less. Also, it is preferred to include, in addition to the spherical solid part, a columnar solid part having roundness (major axis/minor axis) of more than 2 since the physical strength further increases. The three-dimensional network structure has a structure in which stripe-shaped solid parts are three-dimensionally uniformly connected, and the pore diameter decreases as compared with a spherical structure in which spherical solid parts are firmly connected to each other by ununiformly sharing a portion thereof. Therefore, it is considered that pure water permeability decreases even in the case of the same strength and elongation performance.

The weight average molecular weight of the polyvinylidene fluoride-type resin used in the support layer may be appropriately selected according to the required strength and water permeability of a separation membrane. However, when the weight average molecular weight increases, the water permeability decreases. In contrast, when the weight average molecular weight decreases, the strength decreases. Therefore, the weight average molecular weight is preferably 50,000 or more and 1,600,000 or less. In the case of the use in a water treatment in which a polymer separation membrane is exposed to chemical washing, the weight average molecular weight is more preferably 100,000 or more and 700,000 or less, and still more preferably 150,000 or more and 600,000 or less.

In the support layer having a spherical structure, in order to enable the support layer to have sufficient physical strength, an average diameter of the spherical solid part is preferably 0.1 μm or more and 5 μm or less. The diameter of each spherical solid part is an average value of a major axis and a minor axis. When the average diameter of the spherical solid part is less than 0.1 μm, voids to be formed between the solid parts become small and permeability decreases. When the average diameter of the spherical solid part exceeds 5 μm, connection between solid parts decreases and the physical strength decreases. Herein, the average diameter of the spherical structure can be determined by photographing a cross section of a layer having a spherical structure along a direction from an outer surface to an inner surface of a separation membrane at a magnification of 3,000 times on arbitrary 20 points using a scanning electron microscope arbitrary, measuring each diameter of 10 or more, preferably 20 or more arbitrary spherical solid parts, and arithmetically averaging the measured diameters. Preferably, it is also possible to determine a circle equivalent diameter from a cross-sectional photograph using an image processing system or the like and to take the circle equivalent diameter as an average diameter of the spherical structure.

Also, the support layer preferably has a homogeneous structure so as to reconcile pure water permeability and physical strength at a high level. When the dense layer exists or the structure incrementally changes, it becomes difficult to reconcile pure water permeability and physical strength.

It is preferred that the separation-functional layer and the support layer have a laminated structure so as to achieve high-level balance between performances of each layer. In general, multilayering is conducted, layers intrude each other at an interface of each layer to form a dense structure and thus permeability decreases. In case layers do not intrude each other, permeability does not decrease while the adhesive strength decreases. Therefore, a lesser number of laminated layers provide the better results, and it is preferred to be composed of two layers of one separation-functional layer and one support layer. Any one of them may be an outer layer or an inner layer. However, the separation-functional layer is preferably disposed at the side to be separated so that the separation-functional layer bears a separation function and the support layer bears a physical strength.

In the separation membrane of the present invention, it is preferred that pure water permeability at 50 kPa and 25° C. is 0.05 m$^3$/m$^2$/hr or more and 10 m$^3$/m$^2$/hr or less, a fracture strength is 6 MPa or more, a membrane thickness is 125 μm or more and 600 μm or less, and a removal ratio to ms-2 phage is 4 log or more. The pure water permeability is more preferably 0.15 m$^3$/m$^2$/hr or more and 7 m$^3$/m$^2$/hr or less. The fracture strength is more preferably 8 MPa or more, and still more preferably 10 MPa or more. The membrane thickness is more preferably 175 μm or more and 400 μm or less. By satisfying the above conditions, it is possible to obtain a separation membrane which has sufficient strength and water permeability in the fields of water treatment, manufacture of pharmaceuticals, food-stuff industry, membrane for blood purification and the like, and also can remove viruses.

The pure water permeability is a permeate flow rate per unit membrane area and unit time measured at 25° C. under a pressure of 50 kPa using pure water. The fracture strength is a value obtained by dividing a maximum point load required to fracture a separation membrane by a cross section of the separation membrane, and can be measured using a tensile tester or the like. The membrane thickness can be determine by measuring a cross section of a separation membrane using a combination of a stereoscopic microscope and a digital measuring instrument, an electron microscope or the like.

Regarding the removal ratio of MS-2 phage, an aqueous solution of sterile distilled water containing Bacteriophage MS-2 having a size of about 25 nm (Bacteriophage MS-2 ATCC 15597-B1) in the concentration of about $1.0 \times 10^7$ PFU/ml was filtered with a separation membrane. Based on the method of Overlay agar assay, Standard Method 9211-D (APHA, 1998, Standard methods for the examination of water and wastewater, 18th ed.), 1 ml of the diluted filtrate was inoculated in a Petri dish for assay and the plaques are counted to determine the concentration of Bacteriophage MS-2. Removal performance is represented by logarithm. For example, 2 log refers to 2 $\log_{10}$ and means that a residual concentration is 1/100.

The separation membrane of the present invention can be preferably used in any form of a hollow fiber membrane and a flat membrane. The hollow fiber membrane is preferably used since it can be efficiently filled into a module and can increase an effective membrane area per unit volume.

The method of producing a separation membrane made of a polyvinylidene fluoride-type resin of the present invention is not particularly limited as long as a polyvinylidene fluoride separation membrane capable of satisfying the above desired features is obtained. For example, the separation membrane can be produced in the following manner.

A single-layered separation membrane composed of a separation-functional layer alone can be produced by forming a polymer solution containing a polyvinylidene fluoride-type resin having a melt viscosity 3,300 Pa·s or more as a solid part into a sheet or hollow fiber shape using a T-die, a double co-extrusion head or the like, and bringing into contact with a solidifying liquid to form a separation-functional layer having a three-dimensional network structure.

Also, a multi-layered structure separation membrane composed of a separation-functional layer and a support layer can be produced by various methods. As an example, a method of laminating a separation-functional layer on a support having a spherical structure will be described below.

First, the support having a spherical structure is produced. As an example of the support, a method of producing a hollow fiber membrane made of a polyvinylidene fluoride-type resin will be described below. The support having a spherical structure is produced by a thermally induced phase separation method in which phase separation of a polyvinylidene fluoride-type resin solution is conducted by cooling. The polyvinylidene fluoride-type resin solution is ejected through an outer tube of a double co-extrusion head for spinning of a hollow fiber membrane and then a hollow portion-forming solution is solidified under cooling in a cooling bath while being ejected through an inner tube of a double co-extrusion head.

The above polyvinylidene fluoride-type resin solution dissolves the polyvinylidene fluoride-type resin in a poor solvent or a good solvent of the resin at a temperature of a crystallization temperature or higher in comparatively high concentration of 20% by weight or more and 60% by weight or less. When the concentration of the resin increases, a support having high strength and elongation characteristics can be obtained. However, the strength and elongation characteristics are too high, porosity of the produced separation membrane decreases and permeability decreases. Also, in case the support is formed into a hollow fiber shape, it is necessary that the viscosity of the prepared polymer solution is within an appropriate range. Therefore, the concentration of the resin is more preferably adjusted within a range of 30% by weight or more and 50% by weight or less.

The cooling bath preferably contains a mixed liquid of a poor or good solvent having the concentration of 50% by weight or more and 95% by weight or less and a non-solvent having the concentration of 5% by weight or more and 50% by weight or less at a temperature of 0° C. or higher and 30° C. or lower. Furthermore, it is preferred to use, as the poor solvent, the same poor solvent as that of the polymer solution since it is easy to maintain the composition of the cooling bath. However, when a high-concentration good solvent is used, the solution may not be solidified unless the temperature is sufficiently lowered, or the obtained hollow fiber membrane may not have a smooth surface because of a low solidification rate. Also, as long as the concentration deviates from the above concentration range, the poor solvent and the good solvent may be mixed. However, when a high-concentration non-solvent is used, a dense layer is formed on an outer surface of the hollow fiber membrane and thus pure water permeability may drastically decreases.

Also, the hollow portion-forming solution is preferably a mixed liquid of a poor or good solvent having the concentration of 50% by weight or more and 95% by weight or less and a non-solvent having the concentration of 5% by weight or more and 50% by weight or less, similarly to the cooling bath. Furthermore, it is preferred to use, as the poor solvent, the same poor solvent as that of the polymer solution.

Herein, the poor solvent is a solvent which cannot dissolve 5% by weight or more of the polyvinylidene fluoride-type resin at a low temperature of lower than 60° C., but can dissolve 5% by weight or more of the polyvinylidene fluoride-type resin at a high temperature range of 60° C. or higher and a melting point of the polyvinylidene fluoride-type resin (for example, about 178° C. in case the polyvinylidene fluoride-type resin is a vinylidene fluoride homopolymer) or lower. It is defined that the solvent which can dissolve 5% by weight or more of the polyvinylidene fluoride-type resin in the poor solvent even at a low temperature of lower than 60°

C. is a good solvent, while a solvent which neither dissolves nor swells the polyvinylidene fluoride-type resin up to a melting point of the polyvinylidene fluoride-type resin or a boiling point of the solvent is a non-solvent.

Herein, examples of the poor solvent of the polyvinylidene fluoride-type resin include medium chain length alkylketones such as cyclohexanone, isophorone, γ-butyrolactone, methyl isoamyl ketone and propylene carbonate; fatty acid esters, alkyl carbonates, and a mixed solvent thereof.

Examples of the good solvent include lower alkylketones such as N-methyl-2-pyrrolidone, dimethyl sulfoxide, N,N-dimethylacetamide, N,N-dimethylformamide, methyl ethyl ketone, acetone, tetrahydrofuran, tetramethylurea and trimethyl phosphate; esters, amides, and a mixed solvent thereof.

Examples of the non-solvent include water; aliphatic hydrocarbons, aromatic hydrocarbons, aliphatic polyhydric alcohols, aromatic polyhydric alcohols, chlorinated hydrocarbons or other chlorinated organic liquids, such as hexane, pentane, benzene, toluene, methanol, ethanol, carbon tetrachloride, o-dichlorobenzene, trichloroethylene, ethylene glycol, diethylene glycol, triethylene glycol, propylene glycol, butylene glycol, pentanediol, hexanediol and low-molecular weight polyethylene glycol; and a mixed solvent thereof.

In the thermally induced phase separation method, two kinds of phase separation mechanism mainly exist. One is a liquid-liquid phase separation method in which a polymer solution dissolved uniformly at a high temperature is separated into a polymer dense phase and a dilute phase because of a decrease in solubility of a solution when the temperature falls, and then the structure is fixed by crystallization. The other one is a solid-liquid phase separation method in which a polymer solution dissolved uniformly at a high temperature is phase-separated into a polymer solid phase and a solvent phase since crystallization of the polymer arises when the temperature falls. A three-dimensional network structure is mainly formed in the former method, whereas, a spherical structure constituted from a spherical texture is mainly formed in the latter method. In case a support having a spherical structure is produced, the latter phase separation mechanism is utilized. In order to produce the support, a combination of a solvent, a resin concentration and a temperature of a polymer solution to which solid-liquid phase separation is induced, a composition and a temperature of a cooling bath is important.

In order to enlarge voids thereby improving permeability and to increase a fracture strength, in addition to the above production processes, stretching of a hollow fiber membrane is useful and preferred. The stretching is conducted by a conventional tenter method, a roll method, a rolling method, or a combination thereof. The temperature during stretching is preferably within a range of 50° C. or higher and 140° C. or lower, more preferably 55° C. or higher and 120° C. or lower, and still more preferably 60° C. or higher and 100° C. or lower. The stretching ratio is preferably 1.1 times or more and 4 times or less, and more preferably 1.1 times or more and 2 times or less. In case the stretching is conducted in a low temperature atmosphere of lower than 50° C., it is difficult to stretch stably and homogeneously. In case of stretching at a temperature of higher than 140° C., since the temperature becomes a temperature near a melting point of a polyvinylidene fluoride-type resin, a structure texture is melted and voids are not enlarged, and thus water permeability is not improved. The stretching is preferably conducted in a liquid since the temperature is easily controlled, but may be conducted in a gas such as steam. Herein, water is simple and preferable as the liquid. In the case of stretching at about 90° C. or higher, a low-molecular weight polyethylene glycol or the like can be preferably used. In contrast, in case such a stretching is not conducted, the permeability and fracture strength decrease as compared with the case where the stretching is conducted, but fracture elongation and removal performance are removed. Therefore, presence/absence of a stretching process and a stretching ratio of the stretching process can be appropriately set according to the use of a separation membrane.

On the hollow fiber membrane having a spherical structure thus formed, a separation-functional layer having a three-dimensional network structure is formed. The method is not particularly limited, but is preferably a method in which a polymer solution composed of a polyvinylidene fluoride-type resin and a good solvent is coated on the surface of a hollow fiber membrane having a spherical structure and then solidified in a solidifying bath mainly of a non-solvent of the polyvinylidene fluoride-type resin thereby coating a separation-functional layer. The method of coating a polyvinylidene fluoride-type resin solution is not particularly limited, but it is preferred to use a method in which a hollow fiber membrane is immersed in the polymer solution or the polymer solution is spray-coated on the hollow fiber membrane. Furthermore, it is preferred to use, as the method of controlling an amount to be coated on the hollow fiber membrane, a method in which a portion of the polymer solution is scraped by passing through a nozzle after coating the polymer solution, or a portion of the polymer solution is blown off by an air knife, in addition to a method of controlling a coating amount of the polymer solution. The above solidifying bath is mainly composed of a non-solvent of a polyvinylidene fluoride-type resin, and may contain a good or poor solvent of the polyvinylidene fluoride-type resin in the proportion within a range of 0% or more and 30% or less. Also, the temperature of the solidifying bath is preferably 0° C. or higher and 70° C. or lower, and more preferably 5° C. or higher and 50° C. or lower.

It is possible to preferably employ, as another method of producing a separation membrane according to the present invention, a method in which a polymer solution forming a separation-functional layer and a polymer solution forming a support layer are simultaneously ejected through a triple co-extrusion head and then solidified. Namely, in the case of producing a composite hollow fiber membrane in which a separation-functional layer is disposed at an outer layer of a hollow fiber membrane and a support layer is disposed at an inner layer, a polymer solution forming a separation-functional layer, a polymer solution forming a support layer and a hollow portion-forming solution are simultaneously ejected through an outer tube, an intermediate tube and an inner tube, respectively, and then these solutions are solidified in a solidifying bath, and thus the objective composite hollow fiber membrane can be obtained.

In order to exert the effects of the present invention to the maximum extent possible, each thickness of a separation-functional layer and a support layer is also important. The thickness of the separation-functional layer is preferably 2 μm or more and 200 μm or less, more preferably 10 μm or more and 200 μm or less, more preferably 15 μm or more and 150 μm or less, more preferably 20 μm or more and 150 μm or less, and still more preferably 25 μm or more and 100 μm or less. When an attempt is made to form the separation-functional layer in a thickness of less than 2 μm, defects are likely to arise, resulting in deterioration of a removal performance. Also, when the thickness of the layer exceeds 200 μm, the effect of imparting pressure resistance to the separation-functional layer by the support layer decreases and the separation-functional layer undergoes deformation. When a pore diameter of the separation-functional layer is enlarged, removal performance decreases. In contrast, when the pore diameter is reduced, pure water permeability decreases.

The thickness of the support layer is preferably 110 μm or more and 400 μm or less, and more preferably 150 μm or more and 300 μm or less. When the thickness of the support layer is less than 110 μm, a physical strength is low. In contrast, when the thickness exceeds 400 μm, pure water permeability decreases.

Herein, each thickness of the separation-functional layer and the support layer can be determined by photographing a cross section along a direction from an outer surface to an inner surface of the entire separation membrane using a scanning electron microscope at a magnification of 300 to 1,000 times, measuring the thickness of the separation-functional layer and the thickness of the support layer on arbitrary 20 points, and arithmetically averaging the thicknesses.

EXAMPLES

The present invention will be described below by way of specific Examples, but the present invention is not limited to the following Examples. Herein, parameters of the separation membrane relating to the present invention were measured by the following methods.

(1) Melt Viscosity

Melt viscosity was measured at a temperature of 230° C. and a shear rate of 100 second$^{-1}$ in accordance with ASTM D3835 using CAPIROGRAPH 1C (die diameter: φ1 mm, die length: 10 mm) manufactured by Toyo Seiki. Co., Ltd.

(2) Solution Viscosity

Solution viscosity was measured at a temperature of 50° C. using a digital viscometer DV-II+Pro manufactured by Brookfield Engineering Laboratories, Inc. A rotor to be used and number of revolutions were appropriately selected by solution viscosity to be measured.

(3) Maximum Pore Diameter of 0.2 μm Thick Thin Layer and Number of Thin Layers of Separation-Functional Layer Using a scanning electron microscope, in a cross section along a direction from an outer surface to an inner surface of a separation membrane, a separation-functional layer was continuously photographed from an outer surface to a border with a support layer at a magnification of 60,000 times. The distance from the outer surface as a starting point to the inner surface was divided into thin layers each having a thickness of 0.2 μm along a thickness direction and a maximum pore diameter existing in each thin layer was measured. Also, the numbers of a thin layer having a maximum pore diameter of less than 0.03 μm, a thin layer having a maximum pore diameter of 0.03 μm or more and less than 0.1 μm, a thin layer having a maximum pore diameter 0.1 μm or more and less than 0.2 μm, a thin layer having a maximum pore diameter 0.2 μm or more and 0.6 μm or less and a thin layer having a maximum pore diameter of more than 0.6 μm were respectively determined.

(4) Average Pore Diameter of Three-Dimensional Network Structure of Separation-Functional Layer Using a scanning electron microscope, a cross section on 20 points of an arbitrarily selected separation membrane was photographed at a magnification of 10,000 times. A major axis and a minor axis of pores were measured on 20 points selected arbitrarily in a depth of 2 μm from an outer surface layer of each photograph, and then all measured values were arithmetically averaged to determine an average pore diameter.

(5) Average Diameter of Spherical Solid Part of Support Layer Having Spherical Structure Using a scanning electron microscope, a layer having a spherical structure of a cross section along a direction from an outer surface to an inner surface of a separation membrane was photographed at 3,000 times on arbitrary 20 points. A diameter of each of arbitrary 20 spherical solid parts of each photograph was measured, and then all measured diameters were arithmetically averaging to determine an average diameter.

(6) Average Pore Diameter of Outer Surface of Separation-Functional Layer

Using a scanning electron microscope, arbitrary selected 20 points on a surface of a separation-functional layer was photographed at a magnification of 60,000 times. A major axis and a minor axis of pores measured on arbitrarily selected 20 points of each photograph were measured, and all measured values were arithmetically averaged to determine an average pore diameter.

(7) Presence/Absence of Macrovoids of 5 mm or More

Using a scanning electron microscope, a separation-functional layer in a cross section along a direction from an outer surface to an inner surface of a separation membrane was photographed at a magnification of 3,000 times and then presence/absence of macrovoids having a diameter of 5 μm or more was confirmed on arbitrary 30 points. When macrovoids do not exist or only macrovoids each having a major axis of less than 5 μm exist, it was judged that the separation membrane does not substantially include macrovoids of 5 μm or more. In contrast, when only one macrovoid of 5 μm or more is observed, it was judged that the separation membrane substantially includes macrovoids of 5 μm or more.

(8) Membrane Thickness and Thickness of Separation-Functional Layer and Support Layer Using a scanning electron microscope, a cross section along a direction from an outer surface to an inner surface of a separation membrane was photographed at a magnification of 300 to 1,000 times, and then a membrane thickness, a thickness of a separation-functional layer and a thickness of a support layer were measured on arbitrary 20 points and the measured thicknesses were arithmetically averaged.

(9) Average Outer Diameter/Inner Diameter of Separation Membrane (Hollow Fiber Membrane)

Using a scanning electron microscope, a cross section of a hollow fiber-shaped separation membrane was photographed at a magnification of 100 times on 20 points. A major axis and a minor axis of an outer diameter and an inner diameter of each photograph were measured on 20 points, and then the measured values were arithmetically averaged to determine an average outer diameter and an average inner diameter.

(10) Average Thickness of Separation Membrane (Hollow Fiber Membrane)

Using a scanning electron microscope, a cross section of a hollow fiber-shaped separation membrane was photographed at a magnification of 100 times on 20 points. The distance from an outermost layer to an end of an innermost layer of each photograph was measured on 20 points, and then the measured distances were arithmetically averaged to determine an average thickness.

(11) Virus Removal Performance

An aqueous solution of distilled water containing Bacteriophage MS-2 having a size of about 25 nm (Bacteriophage MS-2 ATCC 15597-B1) in a concentration of about $1.0 \times 10^7$ PFU/ml was prepared as a virus stock solution. Herein, distilled water to be used was prepared by subjecting distilled water obtained from a pure water device AUTO STILL (manufactured by Yamato Scientific Co., Ltd.) to high-pressure steam sterilization at 121° C. for 20 minutes. In case the separation membrane is a hollow fiber membrane, a small-sized module made of glass having a length of about 200 mm composed of about two hollow fiber membranes was made as the module. In case the separation membrane is a flat membrane, the membrane was cut into a circle having a diameter of 43 mm, which was set in a cylindrical filtration holder. The virus stock solution was fed to the module under the conditions of a temperature of about 20° C. and a filtration differential pressure of about 10 kPa (external pressure). After filtration of about 10 ml of the solution, about 5 ml of the filtrate was collected and then diluted with distilled water by 0 to 1,000 times. Based on the method of Overlay agar assay, Standard Method 9211-D (APHA, 1998, Standard methods for the examination of water and wastewater, 18th ed.), 1 ml of the diluted filtrate was inoculated in a Petri dish for assay and the plaques are counted to determine the concentration of Bacteriophage MS-2. Removal performance was represented by logarithm. For example, 2 log refers to $2 \log_{10}$ and means that a ratio of the concentration of MS-2 after filtration to the concentration of MS-2 before filtration is 1/100. Also, in case any plaque is not counted in the filtrate, it was represented as ≥7 log.

(12) Pure Water Permeability

In case the separation membrane is a hollow fiber membrane, a miniature module having a length of 200 mm composed of four hollow fiber membranes was made as the module. Also, in case the separation membrane is a flat membrane, the membrane was cut into a circle having a diameter of 43 mm, which was set in a cylindrical filtration holder. Reverse osmosis membrane treated water was fed to the module under the conditions of a temperature of about 25° C. and a filtration differential pressure of about 16 kPa (external pressure). Then, pure water permeability was calculated by converting the value obtained by measuring a permeate flow rate ($m^3$) of a given time into the value per unit time (hr), unit effective membrane area ($m^2$) and 50 kPa.

(13) Fracture Strength and Elongation

Using a tensile tester (TENSILON®/RTM-100, manufactured by Baldwin Company Ltd.), a separation membrane wetted with water was subjected to a tensile test at a measurement length of 50 mm, a full-scale load of 5 kg and a crosshead speed of 50 mm/min to determine a fracture force and a fracture elongation. The measurement was repeated 10 times using different specimens and the measured values were arithmetically averaged to determine a fracture strength and a fracture elongation. The fracture strength was determined as a fracture strength ($N/mm^2=Pa$) which is a fracture force (N) per unit cross section ($mm^2$) of a separation membrane.

(14) Degree of Increase in Filtration Resistance

A miniature membrane module having a length of 15 mm was made by accommodating six hollow fiber membranes in an outer casing and fixing ends (FIG. 1). In this membrane module, the hollow fiber membrane is sealed at the end B, while the hollow fiber membrane opens at the end D.

In a 10 L stainless steel pressure tank ADVANTEC PRESSURE VESSEL DV-10 equipped with a pressure gauge, raw water was charged. Similarly, in a 40 L stainless steel pressure tank ADVANTEC PRESSURE VESSEL DV-40 equipped with a pressure gauge, distilled water manufactured by Wako Pure Chemical Industries, Ltd. was charged. A 2-way stopcock was connected to each tank at an outlet of water. As the raw water, water of Lake Biwa (turbidity: 1.0 NTU or less, total organic carbon (TOC): 1.2 mg/L, calcium concentration: 15 mg/L, silicon concentration: 0.5 mg/L, manganese concentration: 0.01 mg/L or less, iron concentration: 0.01 mg/L or less) was used.

The 2-way stopcock of the raw water-containing pressure tank (hereinafter referred to as a raw water tank) was connected to a point A of a miniature membrane module through a 3-way stopcock using a Teflon® tube, and the 2-way stopcock of a distilled water-containing pressure tank (hereinafter referred to as a distilled water tank) was connected to a point B of the miniature membrane module using a Teflon® tube. A point C of the miniature membrane module was sealed by a resin cap thereby enabling permeated water to discharge from the point D.

First, a pressure was applied to the raw water tank by adjusting the pressure (0.4 MPa) of compressed air to 100 KPa using an SMC regulator (AF2000-02, AR2000-02G) and then the 2-way stopcock was opened thereby feeding raw water into the miniature membrane module. At this time, the 3-way stopcock existing between the 2-way stopcock and the miniature membrane module was opened at only the section between the tank and the membrane module, while the 2-way stopcock between the distilled water tank and the point B was closed.

The weight of the permeated water was measured every 5 seconds using an electronic chemical balance AND HF-6000 connected to a personal computer and recorded using a continuous recording program AND RsCom ver. 2.40. Since data obtained in this test is the weight of the permeated water per 5 seconds, filtration resistance was calculated using the equation shown below.

Filtration Resistance(1/m)=(Filtration pressure(kPa))× $10^3$×5×(Membrane Area($m^2$))× $10^6$/((Viscosity of Permeated Water(Pa·s)×(Weight of Permeated Water per 5 seconds(g/s))×(Density of Permeated Water g/ml)))

After a filtration process was continued up to the total amount of the filtered water of 0.065 $m^3/m^2$, the 2-way stopcock of the raw water tank was closed thereby completing the filtration process. Next, the 3-way stopcock existing between the 2-way stopcock and the miniature membrane module was opened in all three directions and the permeated water outlet (point D) of the miniature membrane module was sealed by the resin cap.

A pressure was applied to the distilled water tank by adjusting the pressure (0.4 MPa) of compressed air to 150 KPa using an SMC regulator (AF2000-02, AR2000-02G) and then the 2-way stopcock was opened thereby feeding distilled water into the miniature membrane module. A back washing process was initiated by this operation. After the back washing process was continued until the amount of back washing waste water flowing out of the 3-way stopcock became 10 ml, the 2-way stopcock of the distilled water tank was closed thereby completing the back washing process.

The above operation was repeatedly carried out ten times to one membrane module, and then the amount of the entire filtered water was plotted on the abscissas, whereas, the calculated filtration resistance was plotted on the ordinate.

Herein, plotting was initiated after 30 seconds have passed since the initiation of each filtration. Also, since the weight of the permeated water decreases as filtration resistance increases, the weight of the permeated water every 5 seconds decreases. Since filtration resistance is calculated from the weight of the permeated water every 5 seconds in accordance with the above equation, when the weight of the permeated water decreases, an influence of dispersion of the weight of the permeated water on the calculated filtration resistance becomes large. Therefore, in case the weight of the permeated water drastically decreases, a graph was corrected by moving average approximation of the graph made appropriately.

In the graph of amount of the entire filtered water versus filtration resistance made from the results of the filtration test, or the graph corrected by moving average approximation in some cases, the gradient of a straight line obtained by joining 9 points of filtration resistance upon initiation of the second to tenth filtration process was taken as the degree of increase in filtration resistance from a relationship between the total amount of the filtered water and the filtration resistance. Provided that, in case 9 points do not lie on the straight line, the gradient of the straight line was determined by linear approximation and was taken as the degree of increase in filtration resistance.

Example 1

A vinylidene fluoride homopolymer having a weight average molecular weight of 417,000 (38% by weight) and 62% by weight of γ-butyrolactone were dissolved at 160° C. This polymer solution and an aqueous 85% by weight γ-butyrolactone solution were simultaneously ejected through an outer tube of a double co-extrusion head and an inner tube of the double co-extrusion head, respectively, and then the solutions were solidified in a bath of an aqueous 85% by weight γ-butyrolactone solution at a temperature of 10° C. The obtained membrane was stretched in water at 90° C. by 1.5 times. The obtained membrane is a hollow fiber membrane having a spherical structure and this membrane was used as a support.

Next, 9.6% by weight of a polyvinylidene fluoride homopolymer having a melt viscosity of 6,400 Pa·s (Kynar® HSV900, manufactured by Arkema Inc.) and 2.4% by weight of a polyvinylidene fluoride homopolymer having a melt viscosity of 3,200 Pa·s (Kynar® 760, manufactured by Arkema Inc.) were dissolved in N-methyl-2-pyrrolidone to obtain a membrane-forming stock solution for a separation-functional layer. The mixture of both homopolymers had a melt viscosity of 3400 Pa·s. This membrane-forming stock solution was uniformly coated on the surface of the above hollow fiber membrane and then solidified in water at 23° C. to produce a hollow fiber-shaped separation membrane bearing a separation-functional layer having a three-dimensional network structure formed on a support layer having a spherical structure. The membrane structure and membrane performance of the obtained separation membrane are shown in Table 1.

Example 2

A polyvinylidene fluoride homopolymer having a melt viscosity of 6,400 Pa·s (Kynar® HSV900, manufactured by Arkema Inc.) (12% by weight) was dissolved in N-methyl-2-pyrrolidone to obtain a membrane-forming stock solution for a separation-functional layer. This membrane-forming stock solution was uniformly coated on the surface of the hollow fiber membrane obtained in Example 1 and then solidified in water at 23° C. to produce a hollow fiber-shaped separation membrane bearing a separation-functional layer having a three-dimensional network structure formed on a support layer having a spherical structure. The membrane structure and membrane performance of the obtained separation membrane are shown in Table 1.

Example 3

A polyvinylidene fluoride homopolymer having a melt viscosity of 6,400 Pa·s (Kynar® HSV900, manufactured by Arkema Inc.) (9.6% by weight) and 2.4% by weight of a maleic anhydride-modified polyvinylidene fluoride homopolymer "manufactured by Arkema Inc., Kynar® ADX-111" were dissolved in N-methyl-2-pyrrolidone to obtain a membrane-forming stock solution for a separation-functional layer. This membrane-forming stock solution was uniformly coated on the surface of the hollow fiber membrane obtained in Example 1 and then solidified in water at 23° C. to produce a hollow fiber-shaped separation membrane bearing a separation-functional layer having a three-dimensional network structure formed on a support layer having a spherical structure. The membrane structure and membrane performance of the obtained separation membrane are shown in Table 1.

Example 4

A polyvinylidene fluoride homopolymer having a melt viscosity of 6,400 Pa·s (Kynar® HSV900, manufactured by Arkema Inc.) (9.6% by weight), 1.2% by weight of cellulose diacetate (manufactured by Eastman Chemical Company, CA-398-3) and 1.2% by weight of cellulose triacetate (manufactured by Eastman Chemical Company, CA-436-80S) were dissolved in N-methyl-2-pyrrolidone to obtain a membrane-forming stock solution for a separation-functional layer. This membrane-forming stock solution was uniformly coated on the surface of the hollow fiber membrane obtained in Example 1 and then solidified in water at 23° to produce a hollow fiber-shaped separation membrane bearing a separation-functional layer having a three-dimensional network structure formed on a support layer having a spherical structure. The membrane structure and membrane performance of the obtained separation membrane are shown in Table 1.

Example 5

A polyvinylidene fluoride homopolymer having a melt viscosity of 6,400 Pa·s (Kynar® HSV900, manufactured by Arkema Inc.) (9.6% by weight), 2.4% by weight of a polymethyl methacrylate resin (manufactured by Aldrich, weight average molecular weight: $3.5 \times 10^5$) were dissolved in N-methyl-2-pyrrolidone to obtain a membrane-forming stock solution for a separation-functional layer. This membrane-forming stock solution was uniformly coated on the surface of the hollow fiber membrane obtained in Example 1 and then solidified in water at 23° C. to produce a hollow fiber-shaped separation membrane bearing a separation-functional layer having a three-dimensional network structure formed on a support layer having a spherical structure. The membrane structure and membrane performance of the obtained separation membrane are shown in Table 1.

Example 6

A polyvinylidene fluoride homopolymer having a melt viscosity of 6,400 Pa·s (Kynar® HSV900, manufactured by Arkema Inc.) (9.6% by weight) and 2.4% by weight of polyvinylpyrrolidone (manufactured by BASF, K90) were dissolved in N-methyl-2-pyrrolidone to obtain a membrane-forming stock solution for a separation-functional layer. This membrane-forming stock solution was uniformly coated on the surface of the hollow fiber membrane obtained in Example 1 and then solidified in water at 23° C. to produce a hollow fiber-shaped separation membrane bearing a separation-functional layer having a three-dimensional network structure formed on a support layer having a spherical structure. The membrane structure and membrane performance of the obtained separation membrane are shown in Table 1.

Comparative Example 1

A polyvinylidene fluoride homopolymer having a melt viscosity of 3,200 Pa·s (Kynar® 760, manufactured by Arkema Inc.) (12% by weight) was dissolved in N-methyl-2- pyrrolidone to obtain a membrane-forming stock solution for a separation-functional layer. This membrane-forming stock solution was uniformly coated on the surface of the hollow fiber membrane obtained in Example 1 and then solidified in water at 23° C. to produce a hollow fiber-shaped separation membrane bearing a separation-functional layer having a three-dimensional network structure formed on a support layer having a spherical structure. The membrane structure and membrane performance of the obtained separation membrane are shown in Table 1.

Comparative Example 2

A polyvinylidene fluoride homopolymer having a melt viscosity of 6,400 Pa·s (Kynar® HSV900, manufactured by Arkema Inc.) (12% by weight) was dissolved in γ-butyrolactone to obtain a membrane-forming stock solution. This membrane-forming stock solution was uniformly coated on the surface of the hollow fiber membrane obtained in Example 1 and then solidified in a bath of an aqueous 85% by weight γ-butyrolactone solution at a temperature of 10° C. The obtained separation membrane was a hollow fiber-shaped separation membrane bearing a layer having a spherical structure formed on a support layer having a spherical structure. The membrane structure and membrane performance of the obtained separation membrane are shown in Table 1.

a melt viscosity of 2,600 Pa·s were dissolved in dimethyl sulfoxide to obtain a membrane-forming stock solution. This membrane-forming stock solution had a solution viscosity of 365 Pa·s at 50° C. This membrane-forming stock solution was uniformly coated on the surface of the above hollow fiber membrane and then solidified in water at 23° C. to produce a hollow fiber-shaped separation membrane bearing a separation-functional layer having a three-dimensional network structure formed on a support layer having a spherical structure.

The obtained separation membrane had an outer diameter of 1,430 μm and an inner diameter of 880 μm. The membrane structure and membrane performance are shown in Table 2.

Example 8

First, a hollow fiber membrane having a spherical structure was produced in the same manner as in Example 7. Next, 18% by weight of a polyvinylidene fluoride homopolymer having a melt viscosity of 4,700 Pa·s and 2% by weight of a polyvinylidene fluoride homopolymer having a melt viscosity of 2,600 Pa·s were dissolved in dimethyl sulfoxide to obtain a membrane-forming stock solution. This membrane-forming stock solution had a solution viscosity of 365 Pa·s at 50° C. This membrane-forming stock solution was uniformly coated on the surface of a hollow fiber membrane having a spherical structure and then solidified in an aqueous 60% by weight

TABLE 1

| | | Example 1 | Example 2 | Example 3 | Example 4 | Example 5 | Example 6 | Comparative Example 1 | Comparative Example 2 |
|---|---|---|---|---|---|---|---|---|---|
| | Melt viscosity of polyvinylidene fluoride-type resin (Pa·s) | 3400 | 6400 | 6400 | 6400 | 6400 | 6400 | 3200 | 6400 |
| | Structure of separation-functional layer | Three-dimensional network | Three-dimensional network | Three-dimensional network | Three-dimensional network | Three-dimensional network | Three-dimensional network | Three-dimensional network | Spherical |
| | Support layer | PVDF | PVDF | PVDF | PVDF | PVDF | PVDF | PVDF | PVDF |
| | Hydrophilic polymer | None | None | Hydrophilic PVDF | CDA/CTA | PMMA | PVP | None | None |
| Membrane performance | Virus removal ratio (log) | ≥7.0 | ≥7.0 | ≥7.0 | ≥7.0 | ≥7.0 | ≥7.0 | 3.9 | 2.2 |
| | Pure water permeability ($m^3/m^2/hr$) | 0.21 | 0.19 | 0.25 | 0.28 | 0.31 | 0.42 | 0.22 | 1.9 |
| | Fracture strength (MPa) | 10.1 | 10.3 | 9.9 | 10.5 | 9.8 | 9.7 | 10 | 12.1 |
| | Degree of increase in filtration resistance ($\times 10^{12}/m^2$) | 2.0 | 2.1 | 1.4 | 1.5 | 1.2 | 0.5 | 2.2 | 2.0 |

Example 7

A vinylidene fluoride homopolymer having a weight average molecular weight of 417,000 (38% by weight) and 62% by weight of γ-butyrolactone were dissolved at 160° C. This polymer solution and an aqueous 85% by weight γ-butyrolactone solution were simultaneously ejected through an outer tube of a double co-extrusion head and an inner tube of a double co-extrusion head, respectively, and then solidified in a bath of an aqueous 85% by weight γ-butyrolactone solution at a temperature of 10° C. The obtained membrane was stretched in water at 90° C. by 1.5 times. The obtained membrane was a hollow fiber membrane having a spherical structure. Next, 18% by weight of a polyvinylidene fluoride homopolymer having a melt viscosity of 4,700 Pa·s and 2% by weight of a polyvinylidene fluoride homopolymer having dimethyl sulfoxide solution at 23° C. to produce a hollow fiber-shaped separation membrane bearing a separation-functional layer having a three-dimensional network structure formed on a support layer having a spherical structure. The obtained separation membrane had an outer diameter of 1,480 μm and an inner diameter of 870 μm. The membrane structure and membrane performance are shown in Table 2.

Example 9

First, a hollow fiber membrane having a spherical structure was produced in the same manner as in Example 7. Next, 10% by weight of a polyvinylidene fluoride homopolymer having a melt viscosity of 4,700 Pa·s and 5% by weight of a polyvinylidene fluoride homopolymer having a melt viscosity of 800 Pa·s were dissolved in dimethyl sulfoxide to obtain a membrane-forming stock solution. This membrane-forming stock solution had a solution viscosity of 8 Pa·s at 50° C. This membrane-forming stock solution was uniformly coated on the surface of a hollow fiber membrane having a spherical structure and then solidified in an aqueous 60% by weight dimethyl sulfoxide solution at 23° C. to produce a hollow fiber-shaped separation membrane bearing a separation-functional layer having a three-dimensional network structure formed on a support layer having a spherical structure. The obtained separation membrane had an outer diameter of 1,410 μm and an inner diameter of 880 μm. The membrane structure and membrane performance are shown in Table 2.

Example 10

First, a hollow fiber membrane having a spherical structure was produced in the same manner as in Example 7. Next, 5% by weight of a polyvinylidene fluoride homopolymer having a melt viscosity of 4,700 Pa·s and 10% by weight of a polyvinylidene fluoride homopolymer having a melt viscosity of 2,300 Pa·s were dissolved in dimethyl sulfoxide to obtain membrane-forming stock solution. This membrane-forming stock solution had a solution viscosity of 5.6 Pa·s at 50° C. This membrane-forming stock solution was uniformly coated on the surface of a hollow fiber membrane having a spherical structure and then solidified in an aqueous 60% by weight dimethyl sulfoxide solution at 23° C. to produce a hollow fiber-shaped separation membrane bearing a separation-functional layer having a three-dimensional network structure formed on a support layer having a spherical structure. The obtained separation membrane had an outer diameter of 1,480 μm and an inner diameter of 870 μm. The membrane structure and membrane performance are shown in Table 2.

Comparative Example 3

First, a hollow fiber membrane having a spherical structure was produced in the same manner as in Example 7. Next, 10% by weight of a polyvinylidene fluoride homopolymer having a melt viscosity of 2,600 Pa·s and 5% by weight of a polyvinylidene fluoride homopolymer having a melt viscosity of 800 Pa·s were dissolved in dimethyl sulfoxide to obtain a membrane-forming stock solution. This membrane-forming stock solution had a solution viscosity of 2.4 Pa·s at 50° C. This membrane-forming stock solution was uniformly coated on the surface of a hollow fiber membrane having a spherical structure and then solidified in an aqueous 60% by weight dimethyl sulfoxide solution at 23° C. to produce a hollow fiber-shaped separation membrane bearing a separation-functional layer having a three-dimensional network structure formed on a support layer having a spherical structure. The obtained separation membrane had an outer diameter of 1,420 μm and an inner diameter of 880 μm. The membrane structure and membrane performance are shown in Table 2.

TABLE 2

| | | Example 7 | Example 8 | Example 9 | Example 10 | Comparative Example 3 |
|---|---|---|---|---|---|---|
| | Melt viscosity at 50° C. of resin solution (Pa · s) | 365 | 365 | 8.0 | 5.6 | 2.4 |
| | Melt viscosity of polyvinylidene fluoride-type resin (Pa · s) | 4,700/2600 | 4,700/2600 | 4,700/800 | 4,700/2300 | 2,600/800 |
| | Proportion of polyvinylidene fluoride-type resin having 3,300 Pa · s or more in entire polyvinylidene fluoride-type resin (% by weight) | 90 | 90 | 66.7 | 33.3 | — |
| | Concentration of solvent in solidifying liquid (% by weight) | 0 | 60 | 60 | 60 | 60 |
| Membrane structure | Maximum pore diameter of thin layer having a thickness of 0.2 μm and number of thin layers | | | | | |
| | <0.03 μm | 2 | 0 | 1 | 0 | 1 |
| | 0.03 to 0.1 μm | 28 | 15 | 14 | 3 | 3 |
| | 0.1 to 0.2 μm | 75 | 43 | 18 | 15 | 12 |
| | 0.2 to 0.6 μm | 60 | 96 | 76 | 55 | 21 |
| | >0.6 μm | 5 | 21 | 26 | 57 | 13 |
| | Thickness of separation-functional layer (μm) | 34 | 35 | 27 | 26 | 10 |
| | Presence or absence of macrovoids | None | None | None | None | None |
| | Average diameter of spherical structure (μm) | 1.4 | 1.4 | 1.4 | 1.4 | 1.4 |
| | Thickness of support layer (μm) | 234 | 234 | 238 | 236 | 236 |
| | Membrane thickness (μm) | 268 | 269 | 265 | 262 | 246 |
| Membrane performance | Virus removal ratio (log) | ≥7.0 | ≥7.0 | ≥7.0 | 4.5 | 2.8 |
| | Pure water permeability (m³/m²/hr) | 0.07 | 0.11 | 0.12 | 0.14 | 0.14 |
| | Fracture strength (MPa) | 10.7 | 10.3 | 11.4 | 10.4 | 10.1 |

In Examples 7 to 10, separation membranes having high virus removal performance, high pure water permeability and high physical strength are achieved. In contrast, in Comparative Example 3, since a polymer forming a separation-functional layer has a low melt viscosity, the obtained separation membrane has low virus removal performance.

Example 11

A vinylidene fluoride homopolymer having a weight average molecular weight of 420,000 (KF polymer T#1300, manufactured by KUREHA CORPORATION) (38% by weight) and 62% by weight of γ-butyrolactone (manufactured by Mitsubishi Chemical Corporation: the same shall apply hereinafter) were dissolved at 160° C. to obtain a polymer solution B for a support membrane. Also, 9% by weight of a vinylidene fluoride homopolymer having a measured value of a melt viscosity of 3,300 Pa·s (Kynar® HSV900, manufactured by Arkema Inc., melt viscosity described in a catalogue: 3,300 to 5,500 Pa·s), 2% by weight of polymethyl methacrylate (manufactured by Aldrich, weight average molecular weight: 3.5×10$^5$) and 89% by weight of dimethyl sulfoxide (manufactured by Toray Fine Chemicals Co., Ltd.: the same shall apply hereinafter) were mixed and dissolved at a temperature of 140° C. to obtain a polymer solution A1 for a separation-functional layer, having a solution viscosity of 6 Pa·s. Simultaneously, this polymer solution B for a support membrane and an aqueous 85% by weight γ-butyrolactone solution were concentrically ejected through an outer slit of a double co-extrusion head and a center pipe of a double co-extrusion head, respectively, and then the solutions were solidified in an aqueous 85% by weight γ-butyrolactone solution at a temperature of 10° C., followed by a stretching process by 1.5 times, a desolvation process and further a drying process to obtain a hollow fiber-shaped support membrane. This support membrane was fed into a coating nozzle and the above polymer solution A1 was coated on a support membrane, and then the polymer solution A1 was solidified in water at a solidifying bath temperature of 40° C., followed by a desolvation process to obtain a hollow fiber-shaped separation membrane (hereinafter referred to as a composite hollow fiber membrane). The structure and performance of the obtained membrane are shown in Table 3.

Example 12

A vinylidene fluoride homopolymer having a measured value of a melt viscosity of 5,400 Pa·s (Kynar® HSV900, manufactured by Arkema Inc., melt viscosity described in a catalogue: 3,300 to 5,500 Pa·s) (8% by weight), 2% by weight of a methyl methacrylate-alkyl acrylate copolymer (manufactured by MITSUBISHI RAYON CO., LTD., METABLEN® P-531A, weight average molecular weight: 4.0×10$^6$) and 90% by weight of N-methyl-2-pyrrolidone (manufactured by BASF: the same shall apply hereinafter) were mixed and dissolved at a temperature of 140° C. to obtain a polymer solution A2 for a separation-functional layer, having a solution viscosity of 26 Pa·s. In the same manner as in Example 11, except that the polymer solution A2 was used in place of the polymer solution A1, composite hollow fiber membrane was obtained. The structure and performance of the obtained membrane are shown in Table 3

Example 13

A vinylidene fluoride homopolymer having a measured value of a melt viscosity of 4,700 Pa·s (Kynar® HSV900, manufactured by Arkema Inc., melt viscosity described in a catalogue: 3,300 to 5,500 Pa·s) (13% by weight), 4% by weight of polymethyl methacrylate (manufactured by Aldrich, weight average molecular weight: 9.96×10$^5$) and 83% by weight of N-methyl-2-pyrrolidone were dissolved at a temperature of 140° C. to obtain a polymer solution A3 having a solution viscosity of 50 Pa·s. In the same manner as in Example 11, except that the polymer solution A3 was used in place of the polymer solution A1 and a solidifying bath of water at a temperature of 60° C. was used, a composite hollow fiber membrane was obtained. The structure and performance of the obtained membrane are shown in Table 3.

Example 14

A vinylidene fluoride homopolymer having a measured value of a melt viscosity of 4,700 Pa·s (Kynar® HSV900, manufactured by Arkema Inc., melt viscosity described in a catalogue: 3,300 to 5,500 Pa·s) (11% by weight), 0.5% by weight of a methyl methacrylate-alkyl acrylate copolymer (manufactured by MITSUBISHI RAYON CO., LTD., METABLEN® P-551A, weight average molecular weight: 1.5×10$^6$) and 88.5% by weight of dimethyl sulfoxide were mixed and dissolved at a temperature of 140° C. to obtain a polymer solution A4 having a solution viscosity of 9 Pa·s. In the same manner as in Example 11, except that the polymer solution A4 was used in place of the polymer solution A1, a composite hollow fiber membrane was obtained. The structure and performance of the obtained membrane are shown in Table 3.

Example 15

A vinylidene fluoride homopolymer having a measured value of a melt viscosity of 4,300 Pa·s (Kynar® HSV900, manufactured by Arkema Inc., melt viscosity described in a catalogue: 3,300 to 5,500 Pa·s) (9% by weight), 2% by weight of polymethyl methacrylate (manufactured by Aldrich, weight average molecular weight: 1.2×10$^5$) and 89% by weight of dimethyl sulfoxide were mixed and dissolved at a temperature of 140° C. to obtain a polymer solution A5 having a solution viscosity of 4 Pa·s. In the same manner as in Example 11, except that the polymer solution A5 was used in place of the polymer solution A1 and a solidifying bath of an aqueous 60% by weight dimethyl sulfoxide solution at a temperature of 30° C. was used, a composite hollow fiber membrane was obtained. The structure and performance of the obtained membrane are shown in Table 3.

Example 16

A vinylidene fluoride homopolymer having a measured value of melt viscosity of 3,900 Pa·s (Kynar® HSV900, manufactured by Arkema Inc., melt viscosity described in a catalogue: 3,300 to 5,500 Pa·s) (6% by weight), 0.1% by weight of polymethyl methacrylate (manufactured by Aldrich, weight average molecular weight: 1.2×10$^5$) and 93.9% by weight of N-methyl-2-pyrrolidone were mixed and dissolved at a temperature of 140° C. to obtain a polymer solution A6 having a solution viscosity of 0.8 Pa·s. In the same manner as in Example 11, except that the polymer solution A6 was used in place of the polymer solution A1 and a solidifying bath of water at a temperature of 60° C. was used, a composite hollow fiber membrane was obtained. The structure and performance of the obtained membrane are shown in Table 3.

Example 17

The same polymer solution for a support membrane and polymer solution for a separation-functional layer as those in Example 11 were used. Simultaneously, the polymer solution for a support membrane, the polymer solution for a separation-functional layer and an aqueous 85% by weight γ-butyrolactone solution were concentrically extruded through an inner slit of a triple co-extrusion head, an outer layer slit and a center pipe, respectively, and then these solutions were solidified in an aqueous 30% by weight dimethyl sulfoxide solution at a temperature of 10° C., followed by a desolvation process to obtain a composite hollow fiber membrane. The structure and performance of the obtained membrane are shown in Table 3.

Comparative Example 4

A vinylidene fluoride homopolymer having a measured value of a melt viscosity of 2,900 Pa·s (Arkema Inc., KYNAR® 760, melt viscosity described in a catalogue: 2,300 to 2,900 Pa·s) (9% by weight), 2% by weight of polymethyl methacrylate (manufactured by Aldrich, weight average molecular weight: $3.5 \times 10^5$) and 89% by weight of dimethyl sulfoxide were mixed and dissolved at a temperature 140° C. to obtain a polymer solution A7 having a solution viscosity of 0.2 Pa·s. In the same manner as in Example 11, except that the polymer solution A7 was used in place of the polymer solution A1, a composite hollow fiber membrane was obtained. The structure and performance of the obtained membrane are shown in Table 3.

Comparative Example 5

A vinylidene fluoride homopolymer having a measured value of a melt viscosity of 2,400 Pa·s (Arkema Inc., KYNAR® 760, melt viscosity described in a catalogue: 2,300 to 2,900 Pa·s) (20% by weight), 5% by weight of a methyl methacrylate-alkyl acrylate copolymer (manufactured by MITSUBISHI RAYON CO., LTD., METABLEN® P-531A, weight average molecular weight: $4.0 \times 10^6$) and 75% by weight of dimethyl sulfoxide were mixed and dissolved at a temperature 140° C. to obtain a polymer solution A8 having a solution viscosity of 3 Pa·s. In the same manner as in Example 11, except that the polymer solution A8 was used in place of the polymer solution A1 and a solidifying bath of water at a temperature of 60° C. was used, a composite hollow fiber membrane was obtained. The structure and performance of the obtained membrane are shown in Table 3.

Example 18

A vinylidene fluoride homopolymer having a weight average molecular weight of 420,000 (KF polymer T#1300, manufactured by KUREHA CORPORATION) (38% by weight) and 62% by weight of γ-butyrolactone (manufactured by Mitsubishi Chemical Corporation: the same shall apply hereinafter) were dissolved at 160° C. to obtain a polymer solution B for a support membrane. Also, a vinylidene fluoride homopolymer having a measured value of a melt viscosity of 5,500 Pa·s (Kynar® HSV900, manufactured by Arkema Inc., melt viscosity described in a catalogue: 3,300 to 5,500 Pa·s) (9% by weight), 1% by weight of polyvinylpyrrolidone (manufactured by BASF, K90HM) and 90% by weight of N-methyl-2-pyrrolidone were mixed and dissolved at a temperature 120° C. to obtain a polymer solution A9 for a separation-functional layer. Simultaneously, the polymer solution B for a support membrane and an aqueous 85% by weight γ-butyrolactone solution were concentrically ejected through an outer slit of a double co-extrusion head and a center pipe of a double co-extrusion head, respectively, and these solutions were solidified in an aqueous 85% by weight γ-butyrolactone solution at a temperature of 10° C., followed by a desolvation process, a stretching process by 1.5 times and further a drying process to obtain a hollow fiber-shaped support membrane. This support membrane was fed into a coating nozzle and then the above polymer solution A9 was coated on a support membrane, followed by a process of solidifying in water at a temperature of 40° C. and further a desolvation process to obtain a hollow fiber-shaped separation membrane (herein-

TABLE 3

| | | Example 11 | Example 12 | Example 13 | Example 14 | Example 15 | Example 16 | Example 17 | Comparative Example 4 | Comparative Example 5 |
|---|---|---|---|---|---|---|---|---|---|---|
| Melt viscosity of polyvinylidene fluoride-type resin (Pa·s) | | 3300 | 5400 | 4700 | 4700 | 4300 | 3900 | 3300 | 2900 | 2400 |
| Weight average molecular weight of acrylic resin | | $3.5 \times 10^5$ | $4.0 \times 10^6$ | $9.96 \times 10^5$ | $1.5 \times 10^6$ | $1.2 \times 10^5$ | $1.2 \times 10^5$ | $3.5 \times 10^5$ | $3.5 \times 10^5$ | $4.0 \times 10^6$ |
| Composition of polyvinylidene fluoride-type resin/acrylic resin (wt/wt) | | 82/18 | 80/20 | 76/24 | 96/4 | 82/18 | 98/2 | 82/18 | 82/18 | 80/20 |
| Melt viscosity at 50° C. of resin solution (Pa·s) | | 6 | 26 | 50 | 9 | 4 | 0.8 | 6 | 0.2 | 3 |
| Membrane structure | Presence or absence of macrovoids | None | None | None | None | None | Yes | None | Yes | Yes |
| | Thickness of support layer (μm) | 283 | 288 | 291 | 290 | 286 | 285 | 282 | 292 | 287 |
| | Thickness of separation-functional layer (μm) | 72 | 42 | 26 | 18 | 41 | 20 | 86 | 15 | 17 |
| | Average pore diameter of outer surface of separation-functional layer (μm) | 0.05 | 0.09 | 0.07 | 0.08 | 0.13 | 0.13 | 0.11 | 0.12 | 0.15 |
| | Average pore diameter of three-dimensional network structure (μm) | 0.50 | 0.31 | 0.08 | 0.26 | 0.27 | 0.45 | 0.3 | — | — |
| | Average diameter of spherical structure (μm) | 2.6 | 2.7 | 2.7 | 2.5 | 2.5 | 2.6 | 2.8 | 2.7 | 2.5 |
| | Average outer diameter of composite hollow fiber membrane (μm) | 1,512 | 1,453 | 1,432 | 1,409 | 1,443 | 1,388 | 1,531 | 1402 | 1388 |
| | Average inner diameter of composite hollow fiber membrane (μm) | 802 | 793 | 798 | 793 | 789 | 791 | 795 | 788 | 780 |
| Membrane performance | Pure water permeability ($m^3/m^2/hr$) | 0.31 | 0.26 | 0.19 | 0.23 | 0.25 | 0.38 | 0.27 | 0.39 | 0.42 |
| | Virus removal ratio (log) | 6.4 | ≥7.0 | ≥7.0 | ≥7.0 | 5.6 | 5.2 | ≥7.0 | 1.4 | 1.4 |
| | Fracture strength (MPa) | 8.6 | 7.1 | 10.6 | 9.2 | 8.3 | 6.4 | 6.5 | 7.9 | 6.2 |
| | Fracture elongation (%) | 46 | 38 | 31 | 51 | 51 | 46 | 59 | 42 | 49 |
| | Degree of increase in filtration resistance ($\times 10^{12}/m^2$) | 0.81 | 1.02 | 0.95 | 1.25 | 1.38 | 1.55 | 1.22 | 0.87 | 1.24 | after referred to as a composite hollow fiber membrane). The structure and performance of the obtained membrane are shown in Table 4.

Example 19

A vinylidene fluoride homopolymer having a measured value of a melt viscosity of 4,500 Pa·s (Kynar® HSV900, manufactured by Arkema Inc., melt viscosity described in a catalogue: 3,300 to 5,500 Pa·s) (9% by weight), 1% by weight of polyvinylpyrrolidone (manufactured by BASF, K90) and 90% by weight of dimethyl sulfoxide (manufactured by Toray Fine Chemicals Co., Ltd.: the same shall apply hereinafter) were mixed and dissolved at a temperature 120° C. to obtain a polymer solution A10 for a separation-functional layer. In the same manner as in Example 18, except that the polymer solution A10 was used in place of the polymer solution A9 and a solidifying bath of water at a temperature of 20° C. was used, a composite hollow fiber membrane was obtained. The structure and performance of the obtained membrane are shown in Table 4.

Example 20

A vinylidene fluoride homopolymer having a measured value of a melt viscosity of 5,200 Pa·s (Kynar® HSV900, manufactured by Arkema Inc., melt viscosity described in a catalogue: 3,300 to 5,500 Pa·s) (9% by weight), 1% by weight of polyvinylpyrrolidone (manufactured by BASF, K30) and 90% by weight of N-methyl-2-pyrrolidone were mixed and dissolved at a temperature 120° C. to obtain a polymer solution A11. In the same manner as in Example 18, except that the polymer solution A11 was used in place of the polymer solution A9 and a solidifying bath of water at a temperature of 60° C. was used, a composite hollow fiber membrane was obtained. The structure and performance of the obtained membrane are shown in Table 4.

Example 21

A vinylidene fluoride homopolymer having a measured value of a melt viscosity of 4,800 Pa·s (Kynar® HSV900, manufactured by Arkema Inc., melt viscosity described in a catalogue: 3,300 to 5,500 Pa·s) (12% by weight), 0.5% by weight of polyvinylpyrrolidone (manufactured by BASF, K90HM) and 87.5% by weight of dimethyl sulfoxide were mixed and dissolved at a temperature 120° C. to obtain a polymer solution A12. In the same manner as in Example 18, except that the polymer solution A12 was used in place of the polymer solution A9 and a solidifying bath of an aqueous 60% by weight dimethyl sulfoxide solution at a temperature of 25° C. was used, a composite hollow fiber membrane was obtained. The structure and performance of the obtained membrane are shown in Table 4.

Example 22

A vinylidene fluoride homopolymer having a measured value of a melt viscosity of 5,200 Pa·s (Kynar® HSV900, manufactured by Arkema Inc., melt viscosity described in a catalogue: 3,300 to 5,500 Pa·s) (12% by weight), 0.5% by weight of polyvinylpyrrolidone (manufactured by BASF, K90HM) and 87.5% by weight of N-methyl-2-pyrrolidone were mixed and dissolved at a temperature 120° C. to obtain a polymer solution A13. A hollow support membrane made of polyethylene (manufactured by manufactured by MITSUBISHI RAYON CO., LTD., outer diameter: 450 μm, inner diameter: 280 μm, nominal pore diameter: 0.1 μm, 50 kPa, pure water permeability at 25° C.: 0.58 m$^3$/m$^2$/hr, fracture strength: 4.2 MPa, fracture elongation: 42%) was fed into a coating nozzle and the polymer solution A13 was coated on a support membrane, followed by a process of solidifying in water at a temperature of 40° C. and further a desolvation process to obtain a composite hollow fiber membrane. The structure and performance of the obtained membrane are shown in Table 4.

Example 23

A vinylidene fluoride homopolymer having a measured value of a melt viscosity of 5,500 Pa·s (Kynar® HSV900, manufactured by Arkema Inc., melt viscosity described in a catalogue: 3,300 to 5,500 Pa·s) (10% by weight), 0.5% by weight of polyvinylpyrrolidone (manufactured by BASF, K30), 1% by weight of polymethyl methacrylate (manufactured by Aldrich, weight average molecular weight: 1.2×10$^5$) and 88.5% by weight of N-methyl-2-pyrrolidone were mixed and dissolved at a temperature 120° C. to obtain a polymer solution A14. In the same manner as in Example 18, except that the polymer solution A14 was used in place of the polymer solution A9, a composite hollow fiber membrane was obtained. The structure and performance of the obtained membrane are shown in Table 4.

Example 24

A vinylidene fluoride homopolymer having a measured value of a melt viscosity of 5,000 Pa·s (Kynar® HSV900, manufactured by Arkema Inc., melt viscosity described in a catalogue: 3,300 to 5,500 Pa·s) (10% by weight), 0.5% by weight of polyvinylpyrrolidone (manufactured by BASF, K90HM), 1% by weight of polymethyl methacrylate (manufactured by Aldrich, weight average molecular weight: 1.2×10$^5$) and 88.5% by weight of N-methyl-2-pyrrolidone were mixed and dissolved at a temperature 120° C. to obtain a polymer solution A15. In the same manner as in Example 18, except that the polymer solution A15 was used in place of the polymer solution A9, a composite hollow fiber membrane was obtained. The structure and performance of the obtained membrane are shown in Table 4.

Example 25

In the same manner as in Example 18, except that the same polymer solution A15 as in Example 24 and the same support membrane made of polyethylene as in Example 22 were used, a composite hollow fiber membrane was obtained. The structure and performance of the obtained membrane are shown in Table 4.

Example 26

The same polymer solution B for a support membrane and polymer solution A9 for a separation-functional layer as those in Example 18 were used. Simultaneously, the polymer solution B for a support membrane, the polymer solution A9 and an aqueous 85% by weight γ-butyrolactone solution were concentrically ejected through an inner slit of a triple co-extrusion head, an outer layer slit and a center pipe, respectively, and then these solutions were solidified in an aqueous 30% by weight N-methyl-2-pyrrolidone solution at a temperature of 10° C., followed by a desolvation process to obtain a composite hollow fiber membrane. The structure and performance of the obtained membrane are shown in Table 4.

Example 27

The same polymer solution B for a support membrane and polymer solution A15 for a separation-functional layer as those in Example 24 were used. Simultaneously, the polymer solution B for a support membrane, the polymer solution A15 and an aqueous 85% by weight γ-butyrolactone solution were concentrically ejected through an inner slit of a triple co-extrusion head, an outer layer slit and a center pipe, respectively, and then these solutions were solidified in an aqueous 30% by weight N-methyl-2-pyrrolidone solution at a temperature of 10° C., followed by a desolvation process to obtain a composite hollow fiber membrane. The structure and performance of the obtained membrane are shown in Table 4.

Comparative Example 6

A vinylidene fluoride homopolymer having a measured value of a melt viscosity of 2,900 Pa·s (Arkema Inc., KYNAR® 760, melt viscosity described in a catalogue: 2,300 to 2,900 Pa·s) (9% by weight), 1% by weight of polyvinylpyrrolidone (manufactured by BASF, K90HM) and 89% by weight of N-methyl-2-pyrrolidone were mixed and dissolved at a temperature 120° C. to obtain a polymer solution A16. In the same manner as in Example 18, except that the polymer solution A16 was used in place of the polymer solution A9, a composite hollow fiber membrane was obtained. The structure and performance of the obtained membrane are shown in Table 4.

TABLE 4

|  |  | Example 18 | Example 19 | Example 20 | Example 21 | Example 22 | Example 23 |
|---|---|---|---|---|---|---|---|
| Melt viscosity of polyvinylidene fluoride-type resin (Pa·s) |  | 5,500 | 4,500 | 5,200 | 4,800 | 5,200 | 5,500 |
| Composition of separation-functional layer-forming solution (% by weight) | HSV900 | 9 | 9 | 9 | 12 | 12 | 10 |
|  | Kynar760 | — | — | — | — | — | — |
|  | K90HM | 1 | — | — | 0.5 | 0.5 | — |
|  | K90 | — | 1 | — | — | — | — |
|  | K30 | — | — | 1 | — | — | 0.5 |
|  | PMMA | — | — | — | — | — | 1 |
|  | NMP | 90 | — | 90 | — | 87.5 | 88.5 |
|  | DMSO | — | 90 | — | 87.5 | — | — |
| Content of PVDF in solid part (% by weight) |  | 90 | 90 | 90 | 96 | 96 | 87 |
| Composition of solidifying bath (% by weight) | Water | 100 | 100 | 100 | 40 | 100 | 100 |
|  | NMP | — | — | — | — | — | — |
|  | DMSO | — | — | — | 60 | — | — |
| Temperature of solidifying bath (° C.) |  | 40 | 20 | 60 | 25 | 40 | 40 |
| Membrane structure | Outer diameter (μm) | 1,494 | 1,502 | 1,446 | 1,424 | 510 | 1,502 |
|  | Inner diameter (μm) | 854 | 850 | 852 | 832 | 280 | 824 |
|  | Thickness of separation-functional layer (μm) | 53 | 59 | 32 | 18 | 30 | 71 |
|  | Thickness of support layer (μm) | 267 | 267 | 265 | 278 | 85 | 268 |
|  | Average pore diameter of membrane surface (μm) | 0.1 | 0.04 | 0.06 | 0.05 | 0.06 | 0.02 |
|  | Average pore diameter of three-dimensional network structure (μm) | 0.53 | 0.12 | 0.12 | 0.31 | 0.39 | 0.14 |
|  | Average diameter of spherical structure (μm) | 2.3 | 2.3 | 2.3 | 2.6 | — | 3.2 |
| Membrane performance | Fracture strength (MPa) | 9.5 | 8.6 | 10.1 | 9.5 | 2.8 | 7.9 |
|  | Fracture elongation (%) | 40 | 35 | 67 | 40 | 26 | 42 |
|  | Pure water permeability (m$^3$/m$^2$/hr) | 1.01 | 0.35 | 0.93 | 0.58 | 0.32 | 0.27 |
|  | Virus removal ratio (log) | ≥7.0 | ≥7.0 | ≥7.0 | ≥7.0 | ≥7.0 | ≥7.0 |
|  | Degree of increase in filtration resistance (×10$^{12}$/m$^2$) | 0.28 | 0.31 | 0.35 | 0.60 | 0.75 | 0.43 |

|  |  | Example 24 | Example 25 | Example 26 | Example 27 | Comparative Example 6 |
|---|---|---|---|---|---|---|
| Melt viscosity of polyvinylidene fluoride-type resin (Pa·s) |  | 5,000 | 5,000 | 5,500 | 5,000 | 2,900 |

TABLE 4-continued

| | | | | | | |
|---|---|---|---|---|---|---|
| Composition of separation-functional layer-forming solution (% by weight) | HSV900 | 10 | 10 | 9 | 10 | — |
| | Kynar760 | — | — | — | — | 9 |
| | K90HM | 0.5 | 0.5 | 1 | 0.5 | 1 |
| | K90 | — | — | — | — | — |
| | K30 | — | — | — | — | — |
| | PMMA | 1 | 1 | — | 1 | — |
| | NMP | 88.5 | 88.5 | 90 | 88.5 | 90 |
| | DMSO | — | — | — | — | — |
| Content of PVDF in solid part (% by weight) | | 87 | 87 | 90 | 87 | 90 |
| Composition of solidifying bath (% by weight) | Water | 100 | 100 | 70 | 100 | 100 |
| | NMP | — | — | 30 | — | — |
| | DMSO | — | — | — | — | — |
| Temperature of solidifying bath (° C.) | | 40 | 40 | 10 | 40 | 40 |
| Membrane structure | Outer diameter (μm) | 1,476 | 500 | 1,484 | 1,496 | 1,475 |
| | Inner diameter (μm) | 830 | 280 | 848 | 850 | 833 |
| | Thickness of separation-functional layer (μm) | 41 | 25 | 45 | 48 | 51 |
| | Thickness of support layer (μm) | 282 | 85 | 273 | 275 | 270 |
| | Average pore diameter of membrane surface (μm) | 0.03 | 0.03 | 0.09 | 0.03 | 0.13 |
| | Average pore diameter of three-dimensional network structure (μm) | 0.18 | 0.2 | 0.47 | 0.23 | 0.58 |
| | Average diameter of spherical structure (μm) | 3.4 | — | 2.9 | 3 | 3 |
| Membrane performance | Fracture strength (MPa) | 7.8 | 3 | 6.9 | 8.4 | 7.7 |
| | Fracture elongation (%) | 31 | 29 | 49 | 43 | 32 |
| | Pure water permeability ($m^3/m^2/hr$) | 0.71 | 0.38 | 0.32 | 0.45 | 1.12 |
| | Virus removal ratio (log) | ≥7.0 | ≥7.0 | ≥7.0 | ≥7.0 | 2.2 |
| | Degree of increase in filtration resistance ($\times 10^{12}/m^2$) | 0.35 | 0.43 | 0.52 | 0.49 | 0.33 |

According to embodiments of the present invention, there is provided a separation membrane made of a polyvinylidene fluoride-type resin, which is excellent in a chemical and physical strength, and also reconcile high pure water permeability and high virus removal performance, and method for producing the same. The separation membrane is suitable for use in the fields of water treatment, manufacture of pharmaceuticals, food-stuff industry, membrane for blood purification and the like.

The invention claimed is:

1. A separation membrane comprising a separation-functional layer, wherein the separation-functional layer contains a polyvinylidene fluoride resin having a melt viscosity of 3,300 Pa·s or more and 7,000 Pa·s or less, and the separation-functional layer has a three-dimensional network structure, wherein when the separation-functional layer is divided into thin layers each having a thickness of 0.2 μm along the thickness direction, 50 to 400 thin layers have a maximum pore diameter of 0.03 to 0.6 μm, 1 to 100 thin layers have a maximum pore diameter of 0.1 μm or more and less than 0.2 μm, 1 to 30 thin layers have a maximum pore diameter of 0.03 μm or more and less than 0.1 μm, and 0 to 2 thin layers have a maximum pore diameter of less than 0.03 μm.

2. The separation membrane according to claim 1, wherein the separation-functional layer further contains a hydrophilic polymer.

3. The separation membrane according to claim 2, wherein the hydrophilic polymer is one or more kinds of polymers selected from a polyvinylpyrrolidone-typo resin, an acrylic resin and a cellulose ester resin.

4. The separation membrane according to claim 2, wherein a weight ratio of a polyvinylidene fluoride resin having a melt viscosity 3,300 Pa·s or more and 7,000 Pa·s or less and a hydrophilic polymer contained in the separation-functional layer is within a range from 60/40 to 99/1.

5. The separation membrane according to claim 1, wherein the number of thin layers having a maximum pore diameter is less than 0.03 μm is 0.

6. The separation membrane according to claim 1, wherein the separation-functional layer has a three-dimensional network structure having an average pore diameter of 0.01 μm or more and 1 μm or less.

7. The separation membrane according to claim 1, wherein the three-dimensional network structure does not substantially contain macrovoids of 5 μm or more.

8. The separation membrane according to claim 1, wherein the separation membrane has a multi-layered structure in which a separation-functional layer and a support layer are laminated to each other.

9. The separation membrane according to claim 8, wherein the support layer contains a polyvinylidene fluoride resin and has a spherical structure.

10. The separation membrane according to claim 9, wherein the support layer has a spherical structure having an average diameter of 0.1 µm or more and 5 µm or less.

11. A method for producing the separation membrane according to claim 8, which comprises coating a polymer solution containing the polyvinylidene fluoride type resin on at least one surface of a support and then immersing the coated polyvinylidene fluoride type resin in a solidifying liquid thereby solidifying the polymer solution to form a separation-functional membrane having a three-dimensional network structure, thus producing a separation membrane having a multi-layered structure in which a separation-functional layer and a support layer are laminated to each other, wherein the polymer solution contains 5% by weight or more and 30% by weight or less of the polyvinylidene fluoride type resin having a melt viscosity 3,300 Pa·s or more and 7,000 Pa·s or less.

12. The method for producing the separation membrane according to claim 11, wherein the polymer solution contains the polyvinylidene fluoride resin having a melt viscosity of 3,300 Pa·s or more and 7,000 Pa·s or less and a hydrophilic polymer, and a weight ratio of the polyvinylidene fluoride type resin to the hydrophilic polymer is within a range from 60/40 to 99/1.

13. A method for producing the separation membrane according to claim 8, which comprises simultaneously ejecting a polymer solution contains the polyvinylidene resin to from the separation-functional layer, a polyvinylidene fluoride polymer solution forming a support layer and a hollow portion-forming solution through an outer tube, an intermediate tube and an inner tube, respectively, using a triple co-extrusion head, and then solidifying the ejected polymer solutions in a solidifying bath to produce a hollow fiber membrane in which the separation-functional layer is disposed at an outer layer and the support layer is disposed at an inner layer.

14. The method for producing the separation membrane according to claim 13, wherein the polymer solution forming a separation-functional layer further contains a hydrophilic polymer, and a weight ratio of the polyvinylidene fluoride-type resin to the hydrophilic polymer is within a range from 60/40 to 99/1.

* * * * *